United States Patent
Nakata

(10) Patent No.: US 8,917,445 B2
(45) Date of Patent: Dec. 23, 2014

(54) OPTICAL RECEIVING APPARATUS AND OPTICAL AMPLIFYING APPARATUS

(75) Inventor: Masao Nakata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 166 days.

(21) Appl. No.: 13/356,049

(22) Filed: Jan. 23, 2012

(65) Prior Publication Data

US 2012/0212800 A1 Aug. 23, 2012

(30) Foreign Application Priority Data

Feb. 23, 2011 (JP) ................................. 2011-037687

(51) Int. Cl.
*H04B 10/293* (2013.01)
*H04B 10/67* (2013.01)

(52) U.S. Cl.
CPC ............ *H04B 10/673* (2013.01); *H04B 10/293* (2013.01)
USPC ..................................................... 359/341.42

(58) Field of Classification Search
CPC .......................... H04B 10/293; H04B 10/2941
USPC ..................................................... 359/341.42
See application file for complete search history.

(56) References Cited

U.S. PATENT DOCUMENTS

| | | | |
|---|---|---|---|
| 5,701,195 A | 12/1997 | Chikama | |
| 5,812,710 A * | 9/1998 | Sugaya | ............................ 385/27 |
| 5,818,629 A * | 10/1998 | Kinoshita | ................ 359/337.11 |
| 5,892,616 A | 4/1999 | Takahashi | |
| 5,923,463 A | 7/1999 | Hamada | |
| 5,986,799 A | 11/1999 | Itou et al. | |
| 6,023,366 A * | 2/2000 | Kinoshita | ................ 359/337.12 |
| 6,025,947 A * | 2/2000 | Sugaya et al. | ................... 398/97 |
| 6,038,063 A * | 3/2000 | Tsuda et al. | .............. 359/341.41 |
| 6,108,123 A * | 8/2000 | Kinoshita | ...................... 359/337 |
| 6,282,017 B1 * | 8/2001 | Kinoshita | ................ 359/341.42 |
| 6,560,008 B1 * | 5/2003 | Wada | ............................. 359/337 |
| 6,603,596 B2 * | 8/2003 | Inagaki et al. | ................. 359/341.4 |
| 6,839,162 B2 * | 1/2005 | Sekiya et al. | .............. 359/337.4 |
| 2002/0024723 A1 * | 2/2002 | Sekiya et al. | .............. 359/337.1 |
| 2002/0060837 A1 * | 5/2002 | Inagaki et al. | ................. 359/337 |
| 2002/0196528 A1 * | 12/2002 | Jolley et al. | ................. 359/337.1 |
| 2003/0106990 A1 * | 6/2003 | Tomofuji et al. | ........ 250/214 LA |
| 2003/0123134 A1 * | 7/2003 | Wada | ............................. 359/337 |
| 2006/0198017 A1 * | 9/2006 | Inagaki et al. | ................. 359/337 |
| 2009/0237781 A1 | 9/2009 | Hoshi et al. | |

FOREIGN PATENT DOCUMENTS

| | | |
|---|---|---|
| JP | 05181019 | 7/1993 |
| JP | 7-307704 | 11/1995 |
| JP | 8-250792 | 9/1996 |
| JP | 8-331048 | 12/1996 |

(Continued)

OTHER PUBLICATIONS

Japanese Notification of Reasons for Refusal dated Sep. 30, 2014 in Japanese Application 2011-037687.

*Primary Examiner* — Ari M Diacou
(74) *Attorney, Agent, or Firm* — Staas & Halsey LLP

(57) ABSTRACT

An optical receiving apparatus includes an optical amplification medium that receives an excitation light and an input light, an optical loss medium that receives an output light from the optical amplification medium, a monitor that detects a power level of an output light from the optical loss medium, a controller that controls a power of the excitation light such that the power level of the output light detected by the monitor is at a target value, and a receiver that receives the output light from the optical loss medium, the output light not being optically amplified.

12 Claims, 39 Drawing Sheets

(56) References Cited

FOREIGN PATENT DOCUMENTS

| JP | 9-186383 | 7/1997 |
| JP | 9-331095 | 12/1997 |
| JP | 10-107735 | 4/1998 |
| JP | 10-209970 | 8/1998 |
| JP | 11-112435 | 4/1999 |
| JP | 11-274624 | 10/1999 |
| JP | 2000-294858 | 10/2000 |
| JP | 2003-298528 | 10/2003 |
| JP | 2008-141366 | 6/2008 |
| JP | 2009-232141 | 10/2009 |

* cited by examiner

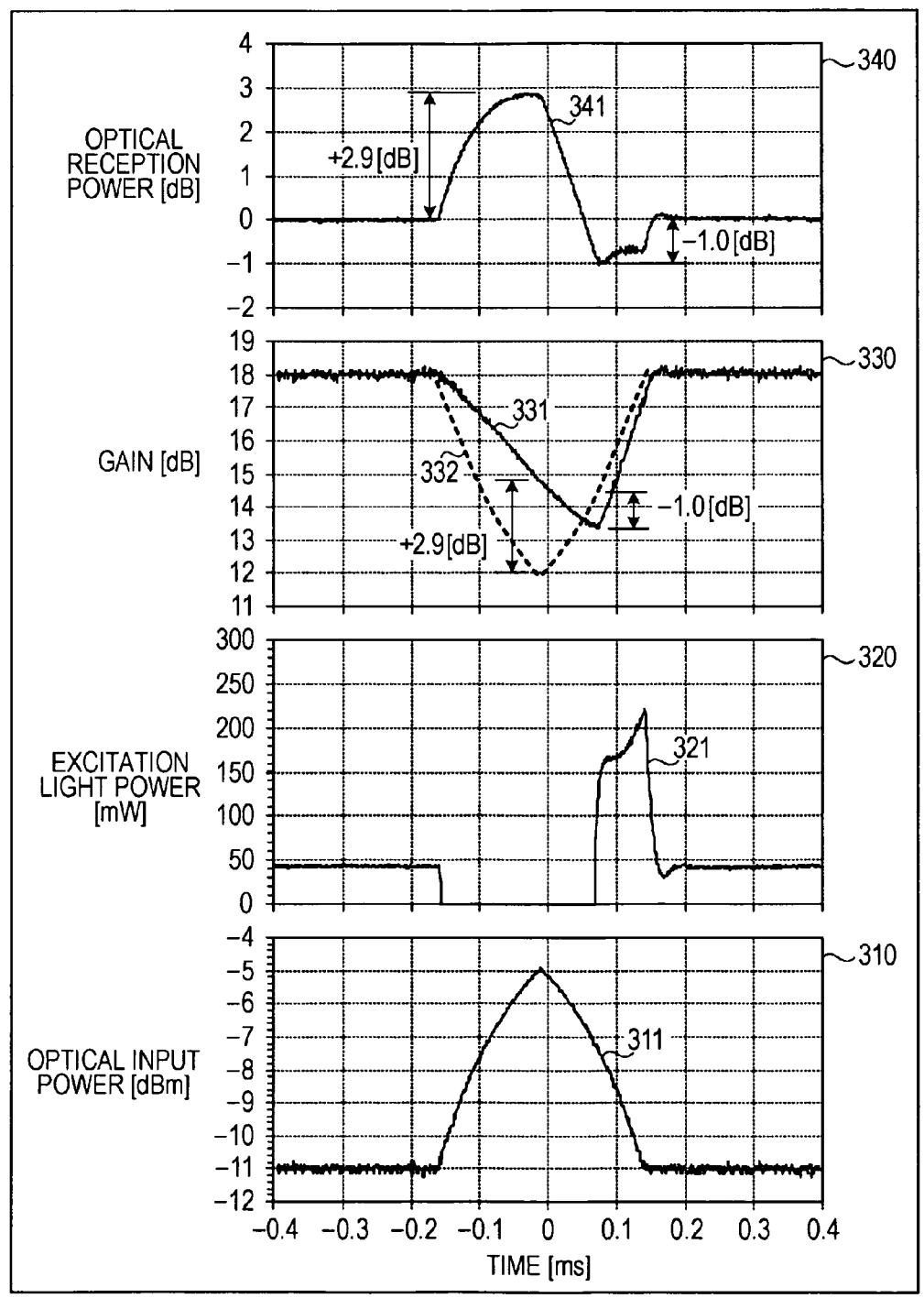

| WAVELENGTH[nm] | OPTICAL LOSS[dB] |
|---|---|
| 1527 TO 1530 | 0.0 |
| 1530 TO 1533 | 0.1 |
| 1533 TO 1536 | 0.2 |
| 1536 TO 1539 | 0.3 |
| 1539 TO 1542 | 0.5 |
| 1542 TO 1545 | 0.7 |
| 1545 TO 1548 | 1.0 |
| 1548 TO 1551 | 1.2 |
| 1551 TO 1554 | 1.5 |
| 1554 TO 1557 | 1.9 |
| 1557 TO 1560 | 2.5 |
| 1560 TO 1563 | 3.2 |
| 1563 TO 1566 | 4.0 |

OPTICAL RECEIVING APPARATUS AND OPTICAL AMPLIFYING APPARATUS

CROSS-REFERENCE TO RELATED APPLICATION

This application is based upon and claims the benefit of priority of the prior Japanese Patent Application No. 2011-037687, filed on Feb. 23, 2011, the entire contents of which are incorporated herein by reference.

FIELD

The embodiments discussed herein are related to an optical receiving apparatus and an optical amplifying apparatus.

BACKGROUND

In an optical transmission system, the power of a transmitted signal light may be changed in a transmitter for an optical signal or in a transmission path by attachment or detachment of an optical fiber or loss variations thereof. For example, in a wavelength division multiplexing (WDM) network, where optical signals having different wavelengths are multiplexed, a reconfigurable optical add/drop multiplexer (ROADM), an optical cross-connect (OXC), or other devices may be used.

In such a network, the number of input-output optical channels or the level of a signal light may be sharply changed by insertion or splitting of an optical signal, switching of an optical transmission path, or a failure, such as a break in an optical transmission fiber.

There is also a network in which an optical amplifying apparatus for collectively amplifying a WDM signal in which optical signals having different wavelengths are multiplexed is used as an optical repeater. In such a network, if the optical amplifying apparatus cannot promptly control the optical output power at a given level in response to a change in the level of an input light resulting from a change in the number of wavelength multiplexing, a variation in the signal light power occurs for each wavelength of a transmitted light.

In an optical receiving apparatus that includes an optical receiver, if the optical reception level departs from the dynamic range by such a temporary change, an in-service transmission signal may be affected and an error may occur. To address this, a configuration that may reduce an overshoot and/or an undershoot of an input into the optical receiver to the dynamic range is used.

For example, in an optical receiving apparatus of the multi-level differential phase modulation type, because a light in which a signal light that had reached an optical receiver was delayed is used as a reference light and the phase of an optical signal is detected using interference of the reference light and a signal light, the dynamic range of an optical receiver is restricted to a limited range of a high optical level.

To address this, there exists a configuration in which the signal light level is raised to the dynamic range of the optical receiver by the use of an optical amplifying apparatus disposed before the optical receiver.

An example of the optical amplifying apparatus is an erbium-doped fiber amplifier (EDFA), in which a fiber doped with erbium ions ($Er^{3+}$) (erbium-doped fiber (EDF)) is used as an optical amplification medium. An EDFA amplifies the optical power of a signal light by the use of induced emission caused by an optical signal traveling in the EDF in which an excitation light output from the excitation light source is injected.

In an optical amplifying apparatus disposed before an optical receiver, auto level control (ALC), which is control for making the level constant, is carried out such that, to achieve a target limited dynamic range, the optical input power of the optical receiver is controlled so as to be a given power. Unfortunately, however, even with a configuration that carries out ALC, if the signal light power sharply varies, the gain of the optical amplifying apparatus may be unable to follow it, and the reception power of the optical receiver may depart from the dynamic range.

Another approach disclosed in the related art is the technique of detecting a recovery from a decrease in the optical input power or an optical surge and using a pass wavelength of a tunable optical filter, the pass wavelength being changed to outside the wavelength range of an optical signal, until the time when the power of a light output from the EDF returns to a steady state to prevent an exceeding optical power from entering the optical receiver. One example of that related techniques are also disclosed in Japanese Laid-open Patent Publication No. 8-331048.

SUMMARY

According to an aspect of an embodiment, An optical receiving apparatus includes an optical amplification medium that receives an excitation light and an input light, an optical loss medium that receives an output light from the optical amplification medium, a monitor that detects a power level of an output light from the optical loss medium, a controller that controls a power of the excitation light such that the power level of the output light detected by the monitor is at a target value, and a receiver that receives the output light from the optical loss medium, the output light not being optically amplified.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A illustrates example changes in characteristics occurring when the optical input power first increases and then returns to the original power if it is assumed that no optical loss medium is included.

FIG. 14 illustrates an example of a table in which a wavelength and an optical loss are associated with each other.

DESCRIPTION OF EMBODIMENTS

Preferred embodiments of the disclosed technique are described in detail below with reference to the accompanying drawings.

<Example Configuration of Optical Receiving Apparatus>

Figure 1:
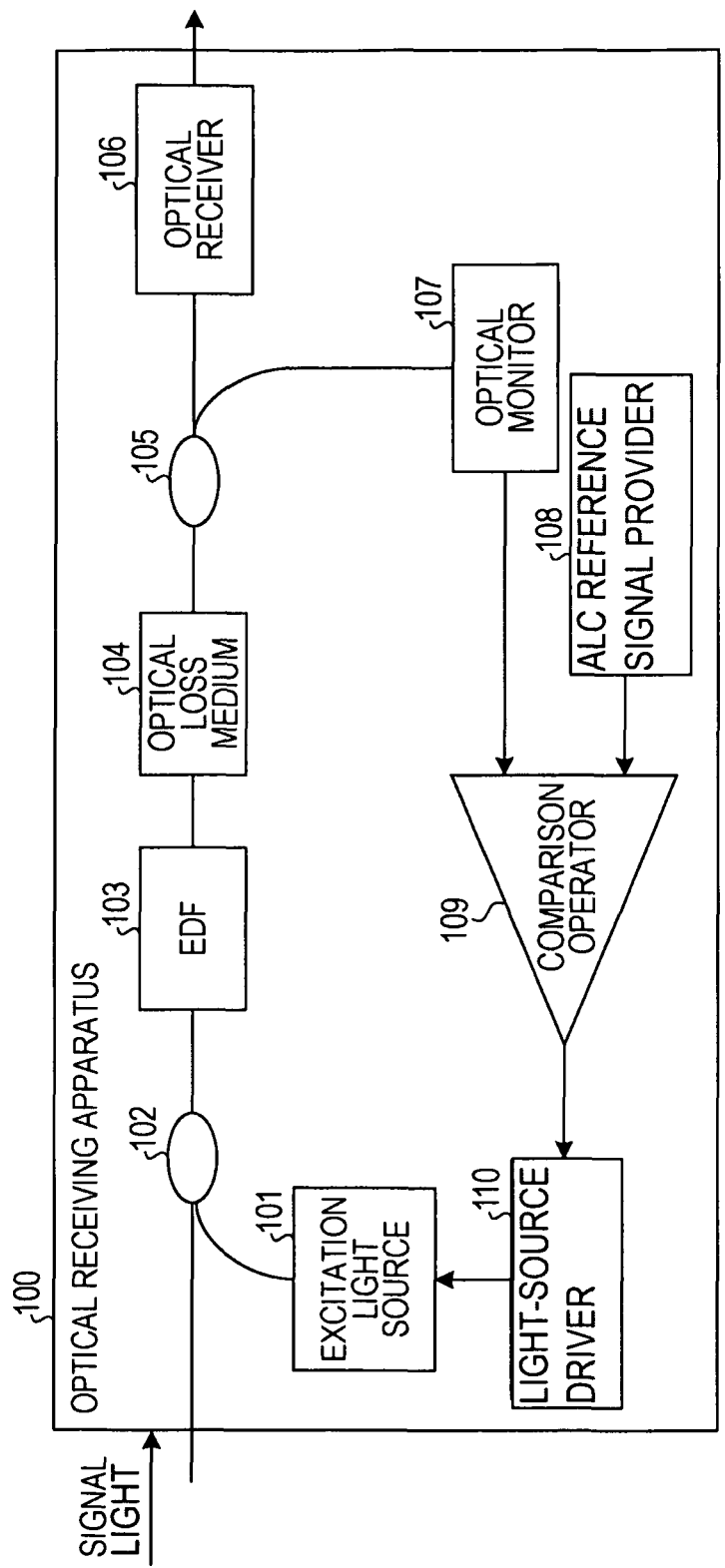
FIG. 1 illustrates an example configuration of an optical receiving apparatus according to a first embodiment.

FIG. 1 illustrates an example configuration of an optical receiving apparatus according to a first embodiment. An optical receiving apparatus 100 according to the first embodiment is an optical receiving apparatus that amplifies and receives an input signal light. As illustrated in FIG. 1, the optical receiving apparatus 100 includes an excitation light source 101, a multiplexer 102, an optical amplification medium 103, an optical loss medium 104, a splitter 105, an optical receiver 106, an optical monitor 107, an ALC reference signal provider 108, a comparison operator 109, and a light-source driver 110.

Each of a comparison operator, light-source driver, and ALC reference signal provider may include circuitry, or alternatively, may include one or more digital signal processors (DSPs) and/or one or more field programmable gate arrays (FPGAs).

An optical receiving apparatus may have a housing and/or a rack and be stored in the housing and/or the rack.

For example, the excitation light source may be made up of one or more laser diodes. No optical amplifier that causes a new surge is disposed between the optical loss medium and the optical receiver. Each of the optical monitor 107, the ALC reference signal provider 108, the comparison operator 109, and the light-source driver 110 may include circuitry, or alternatively, may include one or more digital signal processors (DSPs) and/or one or more field programmable gate arrays (FPGAs).

A signal light input into the optical receiving apparatus 100 is input into the multiplexer 102. In the present specification, the term multiplexer includes a coupler, wavelength division multiplexing (WDM) coupler, and polarization coupler. The excitation light source 101 generates an excitation light having a power corresponding to a driving current output from the light-source driver 110 and outputs the generated excitation light to the multiplexer 102. A laser diode (LD) may be used in the excitation light source 101, for example.

The multiplexer 102 multiplexes an input signal light (input light) and an excitation light output from the excitation light source 101. The multiplexer 102 outputs the multiplexed signal light and excitation light to the optical amplification medium 103.

The optical amplification medium 103 amplifies the signal light output from the multiplexer 102 by causing the signal light and excitation light output from the multiplexer 102 to transmit therethrough. The optical amplification medium 103 outputs the amplified signal light to the optical loss medium 104. An erbium ($Er^{3+}$) doped fiber (EDF) may be used in the optical amplification medium 103, for example.

The optical amplification medium 103 has a characteristic in which the speed of the gain response to a change in the power of an input excitation light increases with an increase in the output power of the optical amplification medium 103.

The optical loss medium 104 attenuates a signal light output from the optical amplification medium 103. The optical loss medium 104 outputs the attenuated signal light to the splitter 105. In the present specification, the term optical loss medium includes a dispersion-compensating fiber, optical attenuator, variable optical attenuator, and neutral density (ND) filter and the like, but does not include an optical fiber used in wiring, and/or an optical monitor splitter for an apparatus having a small optical attenuation.

The splitter 105 splits a signal light output from the optical loss medium 104 and outputs the split signal lights to the optical receiver 106 and the optical monitor 107, respectively. In the present specification, the term splitter includes an optical coupler, WDM coupler, and polarization coupler.

The optical receiver 106 receives a signal light output from the splitter 105. The optical receiver 106 outputs an information signal indicating a reception result. The optical monitor 107 monitors the power of a signal light output from the splitter 105 and outputs a signal indicating the monitored power to the comparison operator 109. The ALC reference signal provider 108 outputs a reference signal indicating a given power to the comparison operator 109.

Specifically, a given power indicated by a reference signal is a target power of a signal light to be received by the optical receiver 106. The target power of the signal light to be received by the optical receiver 106 may be set at an optical level within the dynamic range of the optical receiver 106, for example.

The comparison operator 109 compares a signal from the optical monitor 107 and a reference signal from the ALC reference signal provider 108. The comparison operator 109 outputs a difference signal indicating the difference between the power indicated by the signal from the optical monitor 107 and the power of the reference signal from the ALC reference signal provider 108 to the light-source driver 110.

Accordingly, the difference signal output from the comparison operator 109 indicates the difference between the target value of a power of a signal light to be received by the optical receiver 106 and the power of a signal light actually received by the optical receiver 106.

The light-source driver 110 is also a controller that controls the power of an excitation light output from the excitation light source 101 by outputting, to the excitation light source 101, a driving current based on a difference signal output from the comparison operator 109. Specifically, the light-source driver 110 changes a driving signal toward the excitation light source 101 such that the difference indicated by a difference signal is reduced (e.g., zero).

For example, when the power of a signal light received by the optical receiver 106 is lower than the target power, the light-source driver 110 changes a driving signal toward the excitation light source 101 in accordance with a difference signal such that the power of an excitation light output from the excitation light source 101 is increased.

When the power of a signal light received by the optical receiver 106 is higher than the target power, the light-source driver 110 changes a driving signal toward the excitation light source 101 in accordance with a difference signal such that the power of an excitation light output from the excitation light source 101 is reduced. Thus an ALC feedback loop that increases and/or reduces the power of an excitation light to make the power of a signal light received by the optical receiver 106 constant may be achieved.

Because the optical receiving apparatus 100 includes the optical loss medium 104 after the optical amplification medium 103, the power monitored by the optical monitor 107 is lower than that occurring when the optical loss medium 104 is not included.

Therefore, the power of an excitation light output from the excitation light source 101 is increased under ALC, and as a result, the output power from the optical amplification medium 103 is also increased. Thus the speed of the gain response of the optical amplification medium 103 to a change in the power of an excitation light is increased.

<Gain Response Characteristic of Optical Amplification Medium>

Figure 2:
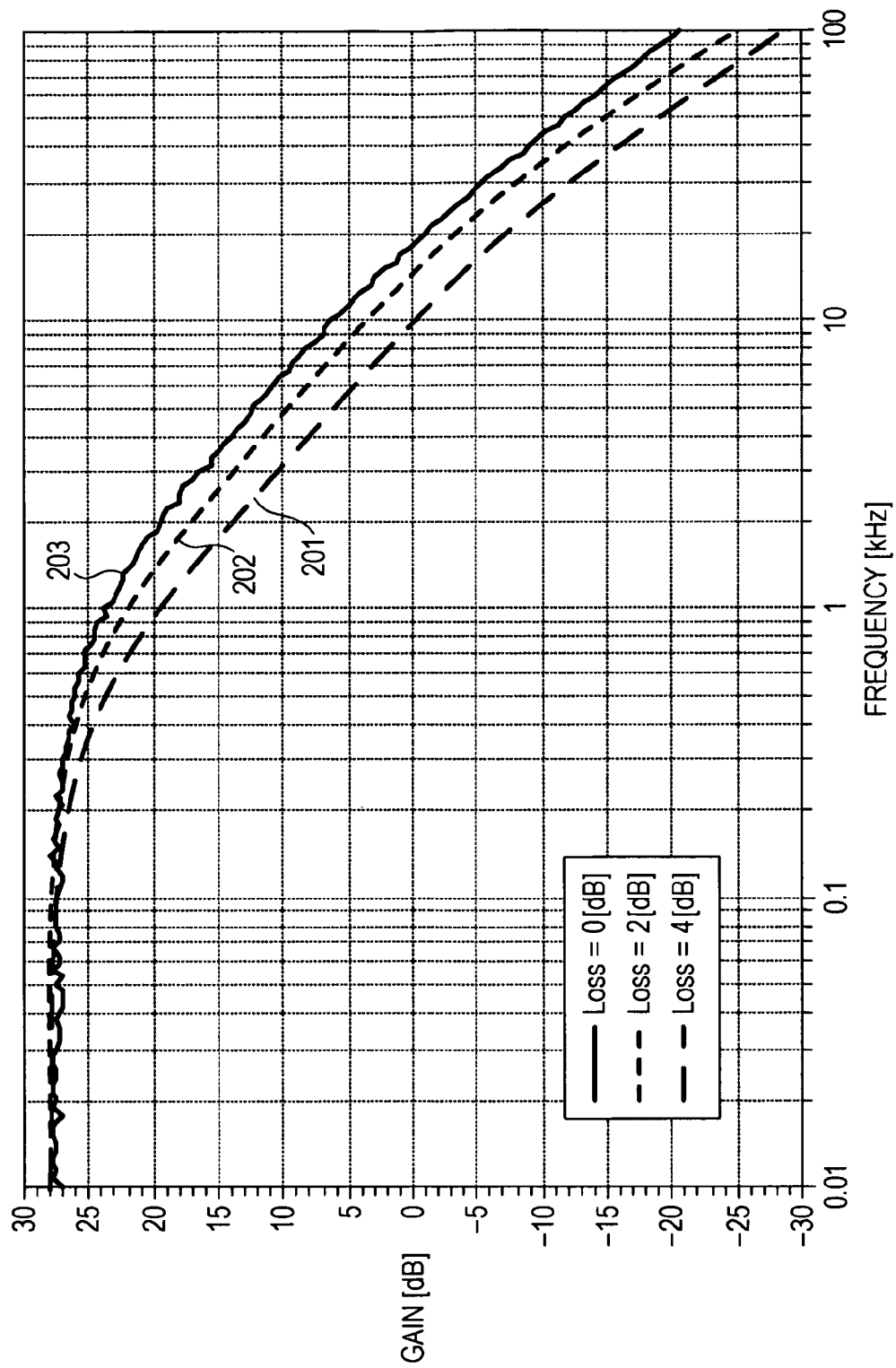
FIG. 2 illustrates the relationship between the magnitude of an optical loss and a gain response characteristic.

FIG. 2 is a graph that illustrates the relationship between the magnitude of an optical loss and a gain response characteristic. FIG. 2 illustrates the speed of the gain of an EDF following a periodic modulation of an excitation light power. In FIG. 2, the horizontal axis represents the frequency in kHz of a periodic modulation of an excitation light power, and the vertical axis represents the gain in dB of an alternating current component in the optical amplification medium 103.

Response characteristics 201 to 203 represent the characteristics of the gain of an alternating current component in the optical amplification medium 103 to the frequency of a modulation of an excitation light when the optical loss in the optical loss medium 104 is 4 dB, 2 dB, and 0 dB, respectively. The optical loss in the optical loss medium 104 corresponds to the amount of an increase of an output power of the optical amplification medium 103. The wavelength of an optical signal may be 1563.45 nm, for example.

When the frequency of a modulation of an excitation light is relatively low, the gain of the optical amplification medium 103 follows a change in the excitation light power. Thus when the frequency of a modulation of an excitation light is relatively low, the gain of the optical amplification medium 103 is substantially constant.

In contrast, when the frequency of a modulation of an excitation light is relatively high, the gain of the optical amplification medium 103 cannot follow a change in the excitation light power. Thus when the frequency of the modulation of the excitation light is relatively high, the gain of the optical amplification medium 103 decreases with an increase in the frequency of a modulation of an excitation light. For example, when the frequency of a modulation of an excitation light is at or above 100 kHz, the gain response of the optical amplification medium 103 is very small.

The frequencies of a modulation at which 3 dB decreases from a reference, for example, a constant gain (approximately +28 dB) when the frequency of a modulation for the response characteristics 201 to 203 is relatively low are 380 Hz, 540 Hz, and 860 Hz, respectively.

Accordingly, the frequency of a modulation at which the gain increases and the speed of the gain response of the optical amplification medium 103 to a change in the power of an excitation light increases with an increase in the optical loss in the optical loss medium 104. The characteristic in which the speed of the gain response of the optical amplification medium 103 increases with an increase in the optical power of the optical amplification medium 103 is substantially the same as that for a light having a wavelength different from 1563.45 nm.

<Changes in Characteristics when Optical Input Power Varies>

FIG. 3A illustrates example changes in characteristics occurring when the optical input power first increases and then returns to the original power if it is assumed that no optical loss medium is included.

Figure 3B:
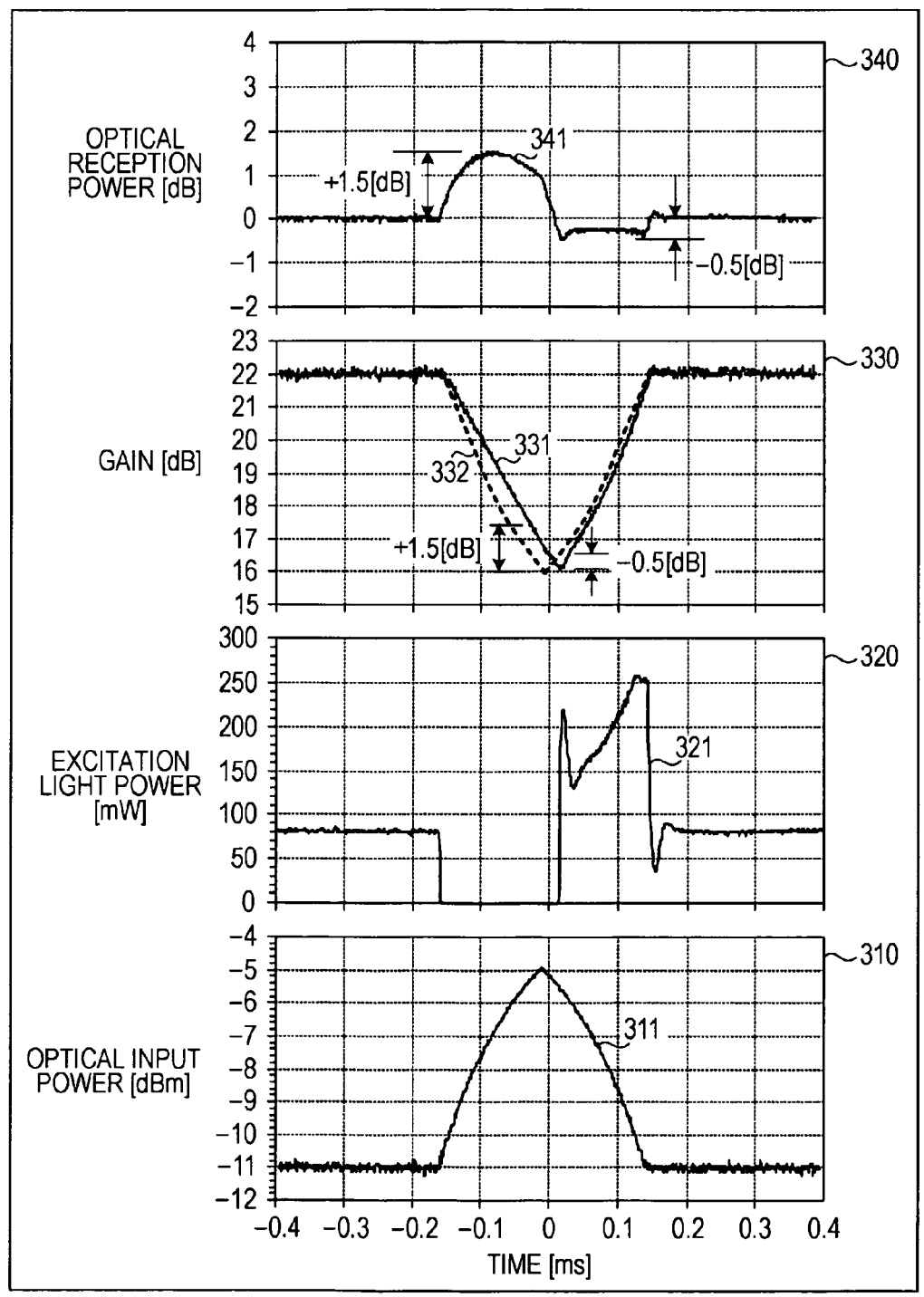
FIG. 3B illustrates example changes in characteristics occurring when the optical input power first increases and then returns to the original power in the optical receiving apparatus according to the first embodiment.

FIG. 3B illustrates example changes in characteristics occurring when the optical input power first increases and then returns to the original power in the optical receiving apparatus according to the first embodiment for reference. In graphs 310, 320, 330, and 340 in each of FIGS. 3A and 3B, the horizontal axis represents the common time in ms.

The vertical axis in the graph 310 in each of FIGS. 3A and 3B represents the power in dBm of a signal light input into the optical receiving apparatus 100 (optical input power). Here, the wavelength of the signal light input into the optical receiving apparatus 100 is 1563.45 nm.

An optical input power change 311 in the graph 310 represents the change over time in the power of the signal light input into the optical receiving apparatus 100.

The vertical axis in the graph 320 in each of FIGS. 3A and 3B represents the power in mW of an excitation light input into the optical amplification medium 103 (excitation light power). An excitation light power response 321 in the graph 320 represents the response of the excitation light power to the optical input power change 311 under ALC.

The vertical axis in the graph 330 in each of FIGS. 3A and 3B represents the signal-light gain in dB of the optical amplification medium 103. A gain response 331 in the graph 330 represents the gain response to the excitation light power response 321.

A gain response 332 in the graph 330 is an ideal gain response of the optical amplification medium 103 at which the power of a signal light received by the optical receiver 106 is maintained constant with respect to the excitation light power response 321 and is illustrated for reference.

The vertical axis in the graph 340 in each of FIGS. 3A and 3B represents the amount of a change in dB in the power of a signal light received by the optical receiver 106 (optical reception power). An optical reception power change 341 in the graph 340 represents the change in the power of a signal light received by the optical receiver 106 over time.

FIGS. 3A and 3B illustrate the example in which the optical input power of the optical receiving apparatus 100 increases from −11.0 dBm by 6 dB over 150 μs and then returns to the original power over 150 μs, as indicated by the optical input power change 311.

First, the case where it is assumed that the optical receiving apparatus 100 does not include the optical loss medium 104 is described for reference. Changes in the characteristics of the optical receiving apparatus 100 in that case are illustrated in FIG. 3A. When the optical input power of the optical receiving apparatus 100 sharply increases, as indicated by the excitation light power response 321 in FIG. 3A, the excitation light power sharply decreases under ALC performed by the light-source driver 110.

When the excitation light power decreases, as indicated by the gain response 331 in FIG. 3A, the gain of the optical amplification medium 103 decreases. Here, when the excitation light power sharply decreases, the gain response 331 of the optical amplification medium 103 lags behind the ideal gain response 332.

Accordingly, the decrease in the gain of the optical amplification medium 103 delays. When the decrease in the gain of the optical amplification medium 103 delays during the increase in the optical input power, as indicated by the optical reception power change 341 in FIG. 3A, the optical reception power of the optical receiver 106 increases. For the example illustrated in FIG. 3A, the optical reception power of the optical receiver 106 increases by 2.9 dB.

When the optical input power of the optical receiving apparatus 100 sharply decreases, as indicated by the excitation light power response 321 in FIG. 3A, the excitation light power sharply increases under ALC performed by the light-source driver 110.

When the excitation light power increases, as indicated by the gain response 331 in FIG. 3A, the gain of the optical amplification medium 103 increases. Here, when the excitation light power sharply increases, the gain response 331 of the optical amplification medium 103 lags behind the ideal gain response 332.

Accordingly, the increase in the gain of the optical amplification medium 103 delays. When the increase in the gain of the optical amplification medium 103 delays during the decrease in the optical input power, as indicated by the optical reception power change 341 in FIG. 3A, the optical reception power of the optical receiver 106 decreases. For the example illustrated in FIG. 3A, the optical reception power of the optical receiver 106 decreases by 1.0 dB.

For example, when the dynamic range of the optical receiver 106 with a maximum of +1.8 dB and a minimum of −1.0 dB is set, the optical reception power of the optical receiver 106 departs from the dynamic range for the example illustrated in FIG. 3A.

In contrast, the optical receiving apparatus 100 includes the optical loss medium 104 after the optical amplification medium 103. Here, the optical loss of the optical loss medium 104 is 4 dB. In that case, the output power of the optical amplification medium 103 increases by 4 dB under ALC performed by the light-source driver 110. In that case, the optical receiving apparatus 100 has the characteristics illustrated in FIG. 3B.

Specifically, the inclusion of the optical loss medium 104 reduces the power of a signal light monitored by the optical monitor 107. In response to this, the light-source driver 110 increases the excitation light power, as revealed by comparison between the graphs 320 in FIGS. 3A and 3B.

As a result, the output power of the optical amplification medium 103 increases. When the output power of the optical amplification medium 103 increases, the speed of the gain response of the optical amplification medium 103 to a change in the excitation light power increases (for example, see FIG. 2). Accordingly, as indicated by the graph 330 in FIG. 3B, the delay in the decrease in the gain of the optical amplification medium 103 to the increase in the optical input power of the optical receiving apparatus 100 decreases.

Thus as indicated by the graph 340 in FIG. 3B, the increase in the optical reception power of the optical receiver 106 may be suppressed. For the example illustrated in FIG. 3B, the increase in the optical reception power of the optical receiver 106 is suppressed to 1.5 dB.

As indicated by the graph 330 in FIG. 3B, the delay in the increase in the gain of the optical amplification medium 103 to the decrease in the optical input power of the optical receiving apparatus 100 decreases. Accordingly, the decrease in the optical reception power of the optical receiver 106 may be suppressed. For the example illustrated in FIG. 3B, the decrease in the optical reception power of the optical receiver 106 is suppressed to 0.5 dB.

For example, when the dynamic range of the optical receiver 106 with a maximum of +1.8 dB and a minimum of −1.0 dB is set, the optical reception power of the optical receiver 106 is within the dynamic range for the example illustrated in FIG. 3B. Thus the occurrence of errors in a transmission signal may be reduced.

As described above, the inclusion of the optical loss medium 104 enables a variation in the optical reception power of the optical receiver 106 occurring when the optical input power first increases and then returns to the original power to be suppressed.

Figure 4A:
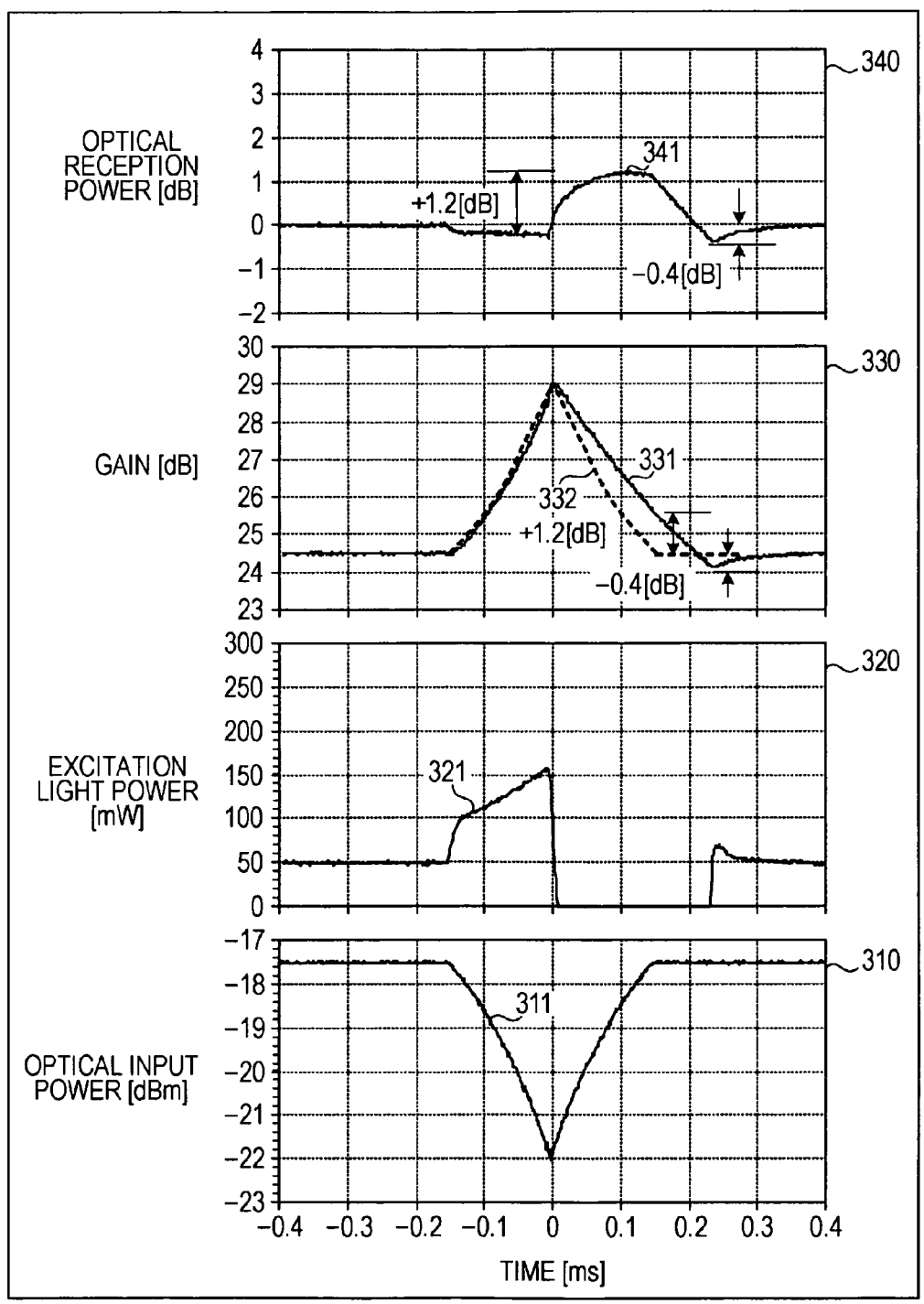
FIG. 4A illustrates example changes in characteristics occurring when the optical input power first decreases and then returns to the original power if it is assumed that no optical loss medium is included.
Figure 4B:
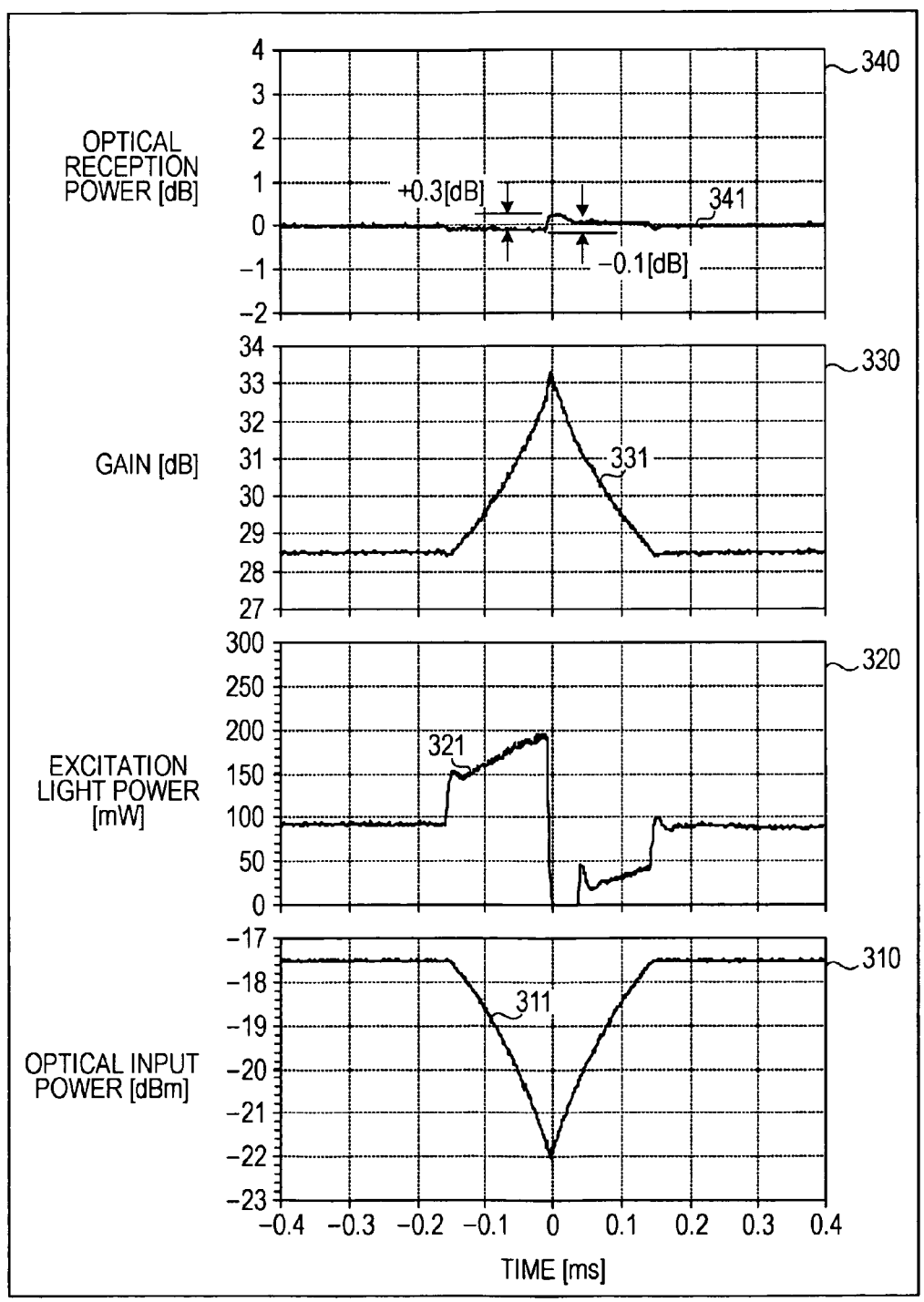
FIG. 4B illustrates example changes in characteristics occurring when the optical input power first decreases and then returns to the original power in the optical receiving apparatus according to the first embodiment.

FIG. 4A illustrates example changes in characteristics occurring when the optical input power first decreases and then returns to the original power if it is assumed that no optical loss medium is included. FIG. 4B illustrates example changes in characteristics occurring when the optical input power first decreases and then returns to the original power in the optical receiving apparatus according to the first embodiment for reference.

In FIGS. 4A and 4B, the same reference numerals are used as in FIGS. 3A and 3B for similar parts, and the description thereof is omitted. FIGS. 4A and 4B illustrate the example in which the optical input power of the optical receiving apparatus 100 increases from −17.5 dBm by 4.5 dB over 150 μs and then returns to the original power over 150 μs, as indicated by the optical input power change 311.

First, the case where it is assumed that the optical receiving apparatus 100 does not include the optical loss medium 104 is described. In the case illustrated in FIG. 4A, when the optical input power of the optical receiving apparatus 100 sharply increases, as indicated by the optical reception power change 341 in FIG. 4A, the optical reception power of the optical receiver 106 increases, as in the case in FIG. 3A. For the example illustrated in FIG. 4A, the optical reception power of the optical receiver 106 increases by 1.2 dB.

When the optical input power of the optical receiving apparatus 100 returns to the original, as indicated by the excitation light power response 321 in FIG. 4A, the excitation light power increases under ALC performed by the light-source driver 110.

It is to be noted that because the gain response 331 lags, the optical reception power of the optical receiver 106 temporarily decreases, as indicated by the optical reception power change 341 in FIG. 4A. For the example illustrated in FIG. 4A, the optical reception power of the optical receiver 106 decreases by 0.4 dB.

In contrast, the optical receiving apparatus 100, which includes the optical loss medium 104 after the optical amplification medium 103, have the characteristics illustrated in FIG. 4B. Specifically, the inclusion of the optical loss medium 104 enables a reduction in the delay in the decrease in the gain of the optical amplification medium 103 to the increase in the optical input power of the optical receiving apparatus 100, as indicated by the graph 330 in FIG. 4B.

Accordingly, as indicated by the graph 340 in FIG. 4B, the increase in the optical reception power of the optical receiver 106 may be suppressed. For the example illustrated in FIG. 4B, the increase in the optical reception power of the optical receiver 106 is suppressed to 0.3 dB.

As indicated by the graph 330 in FIG. 4B, the delay in the increase in the gain of the optical amplification medium 103 to the decrease in the optical input power of the optical receiving apparatus 100 decreases. Accordingly, the decrease in the optical reception power of the optical receiver 106 may be suppressed. For the example illustrated in FIG. 4B, the decrease in the optical reception power of the optical receiver 106 is suppressed to 0.1 dB.

As described above, the inclusion of the optical loss medium 104 enables a variation in the optical reception power of the optical receiver 106 occurring when the optical input power first decreases and then returns to the original power to be suppressed.

<Example Modification of Optical Receiving Apparatus>

Figure 5:
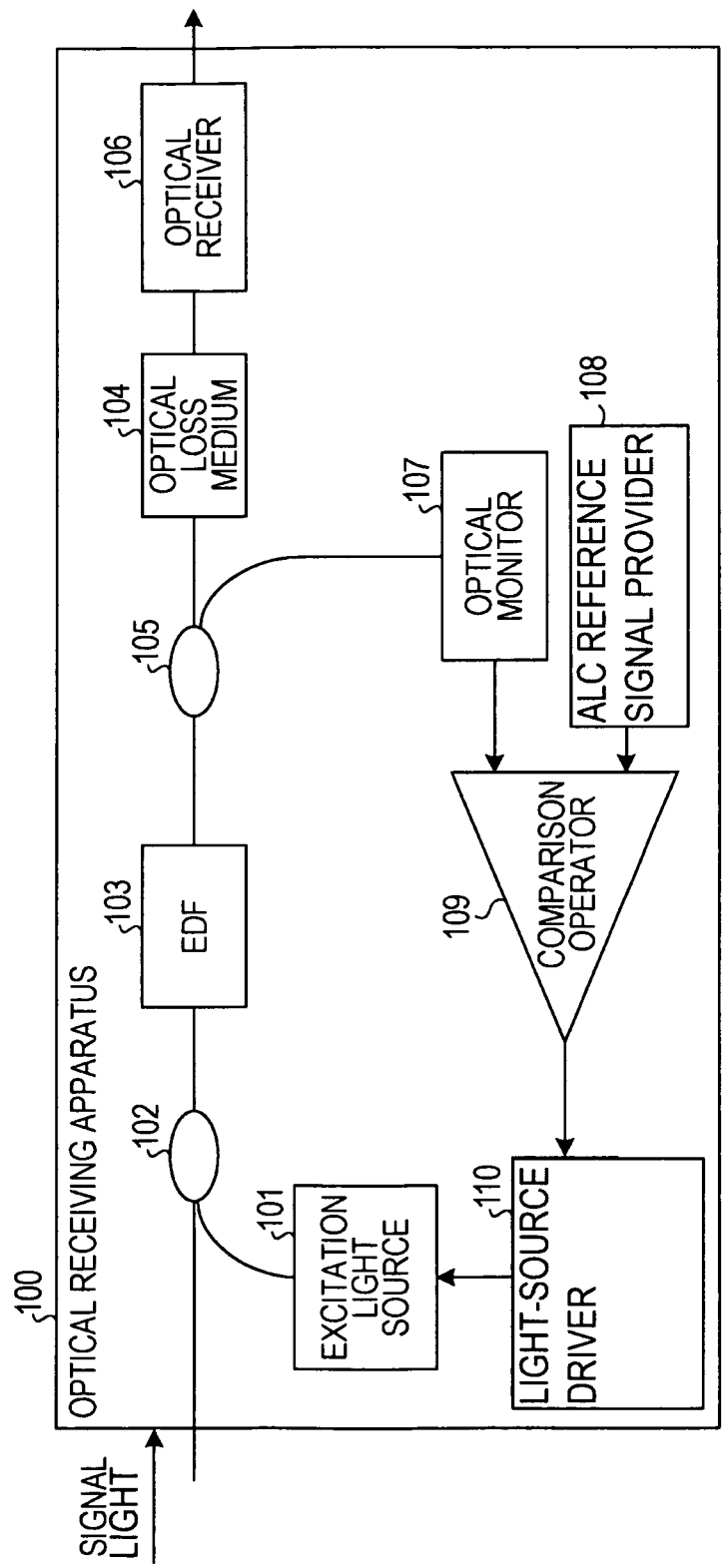
FIG. 5 illustrates an example modification of the optical receiving apparatus according to the first embodiment.

FIG. 5 illustrates an example modification of the optical receiving apparatus according to the first embodiment. In FIG. 5, the same reference numerals are used as in FIG. 1 for similar parts, and the description thereof is omitted. As illustrated in FIG. 5, the splitter 105 in the optical receiving apparatus 100 according to the first embodiment may be disposed between the optical amplification medium 103 and the optical loss medium 104.

In that case, a reference signal output from the ALC reference signal provider 108 is a signal indicating the power in which the amount of the optical loss of the optical loss medium 104 is added to the target optical reception power of the optical receiver 106.

Even in that case, the optical reception power of the optical receiver 106 may be maintained at the target power under ALC performed by the light-source driver 110. Because the target value in ALC is the power in which the amount of the optical loss of the optical loss medium 104 is added to the target optical reception power of the optical receiver 106, the optical output power of the optical amplification medium 103 may be increased and the speed of the gain response of the optical amplification medium 103 may be increased. Accordingly, a variation in the optical reception power of the optical receiver 106 caused by a change in the optical input power may be suppressed.

As described above, with the optical receiving apparatus 100 according to the first embodiment, the inclusion of the optical loss medium 104 after the optical amplification medium 103, in which the gain is controlled such that the optical reception power of the optical receiver 106 is constant, enables an increase in the optical output power of the optical amplification medium 103.

Accordingly, the speed of the gain response of the optical amplification medium 103 to a change in the excitation light power resulting from a change in the optical input power may be increased and variation in the optical reception power of the optical receiver 106 caused by the change in the optical input power may be suppressed. Thus the optical transmission quality may be improved even with a simple configuration. Even if a signal light having a line width in which the strength concentrates on a specific wavelength is input, unlike a configuration that uses an optical filter, a break in an optical signal may be avoided.

When the optical loss of the optical loss medium 104 is large, the excitation light power is large under ALC.

For example, where the optical input power of the optical receiving apparatus 100 is 17.5 dBm, the excitation light power is 49.5 mW for the example illustrated in FIG. 4A, whereas it is 92.2 mW for the example illustrated in FIG. 4B.

Accordingly, when the optical loss is large, the power consumption of the excitation light source 101 is large.

For example, when the optical receiving apparatus 100 is used in each channel in a receiving station in a WDM optical transmission system, if the power consumption of the optical receiving apparatus 100 of each channel is large, the total power consumption in the receiving station is very large.

In contrast, for the optical receiving apparatus 100 according to the first embodiment, an increase in the power consumption may be suppressed by setting the optical loss in accordance with the wavelength of a signal light using the relationship between the wavelength of the signal light and the gain response characteristic of the optical amplification medium.

<Relationship Between Wavelength of Signal Light and Gain Response Characteristic of Optical Amplification Medium>

Figure 6:
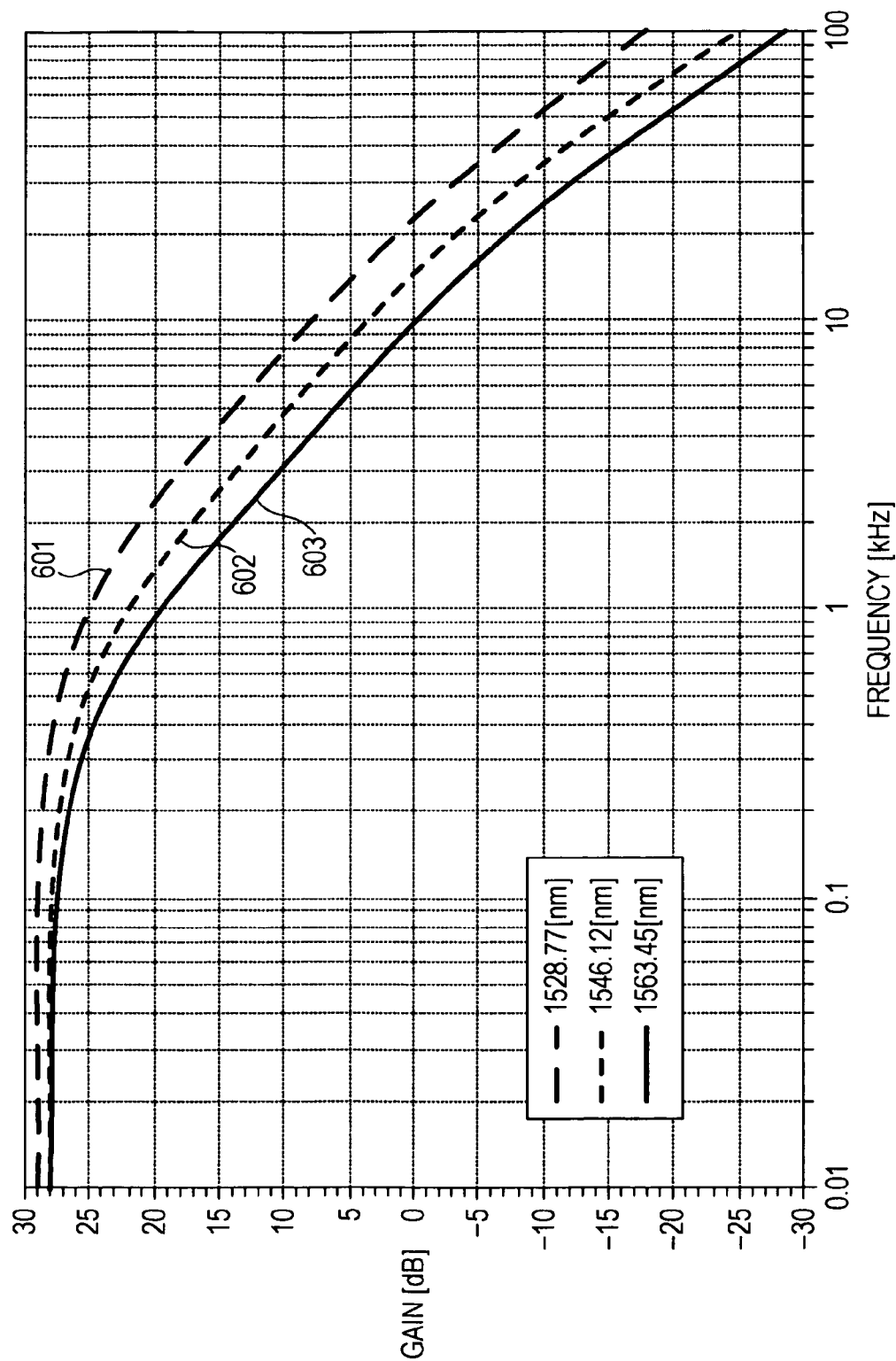
FIG. 6 illustrates the relationship between the wavelength of a signal light and the gain response characteristic.

FIG. 6 is a graph that illustrates the relationship between the wavelength of a signal light and a gain response characteristic of the optical amplification medium. In FIG. 6, the horizontal axis represents the frequency in kHz of a periodic modulation of the excitation light power, and the vertical axis represents the gain in dB of an alternating current component in the optical amplification medium 103.

Response characteristics 601 to 603 represent the gain characteristics of the optical amplification medium 103 to the frequency of a modulation of an excitation light when the wavelength of the signal light is 1528.77 nm, 1546.12 nm, and 1563.45 nm, respectively.

For the response characteristics 601 to 603, the output power of the optical amplification medium 103 is the same. For the response characteristics 601 to 603, when the frequency of a modulation of an excitation light is relatively low, the gain of the optical amplification medium 103 is substantially constant.

In contrast, when the frequency of a modulation of an excitation light is relatively high, the gain of the optical amplification medium 103 decreases with an increase in the frequency of the modulation of the excitation light.

The frequencies of a modulation at which 3 dB decreases from a reference, for example, a constant gain (approximately +28 dB) when the frequency of a modulation is relatively-low for the response characteristics 601 to 603 are 750 Hz, 510 Hz, and 380 Hz, respectively.

Accordingly, the frequency of a modulation at which the gain decreases increases with a reduction in the wavelength of a signal light. That is, the speed of the gain response of the optical amplification medium 103 increases with a reduction in the wavelength of a signal light.

<Changes in Characteristics when Optical Input Power Varies for Each Signal Wavelength ACcording to First Embodiment>

Figure 7A:
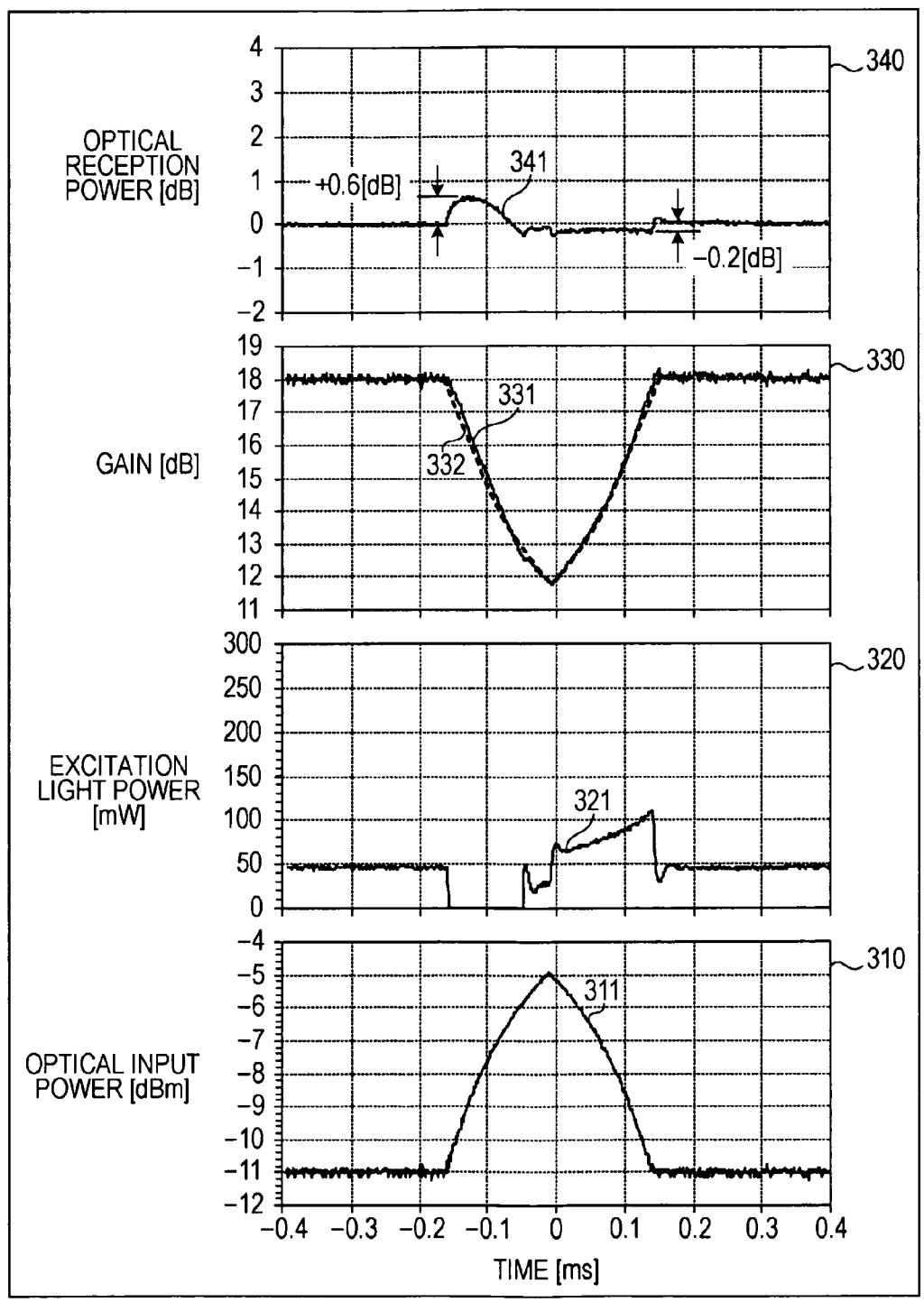
FIG. 7A illustrates example changes in characteristics occurring when an input power of a signal light having a wavelength of 1528.77 nm first increases and then returns to the original power.
Figure 7B:
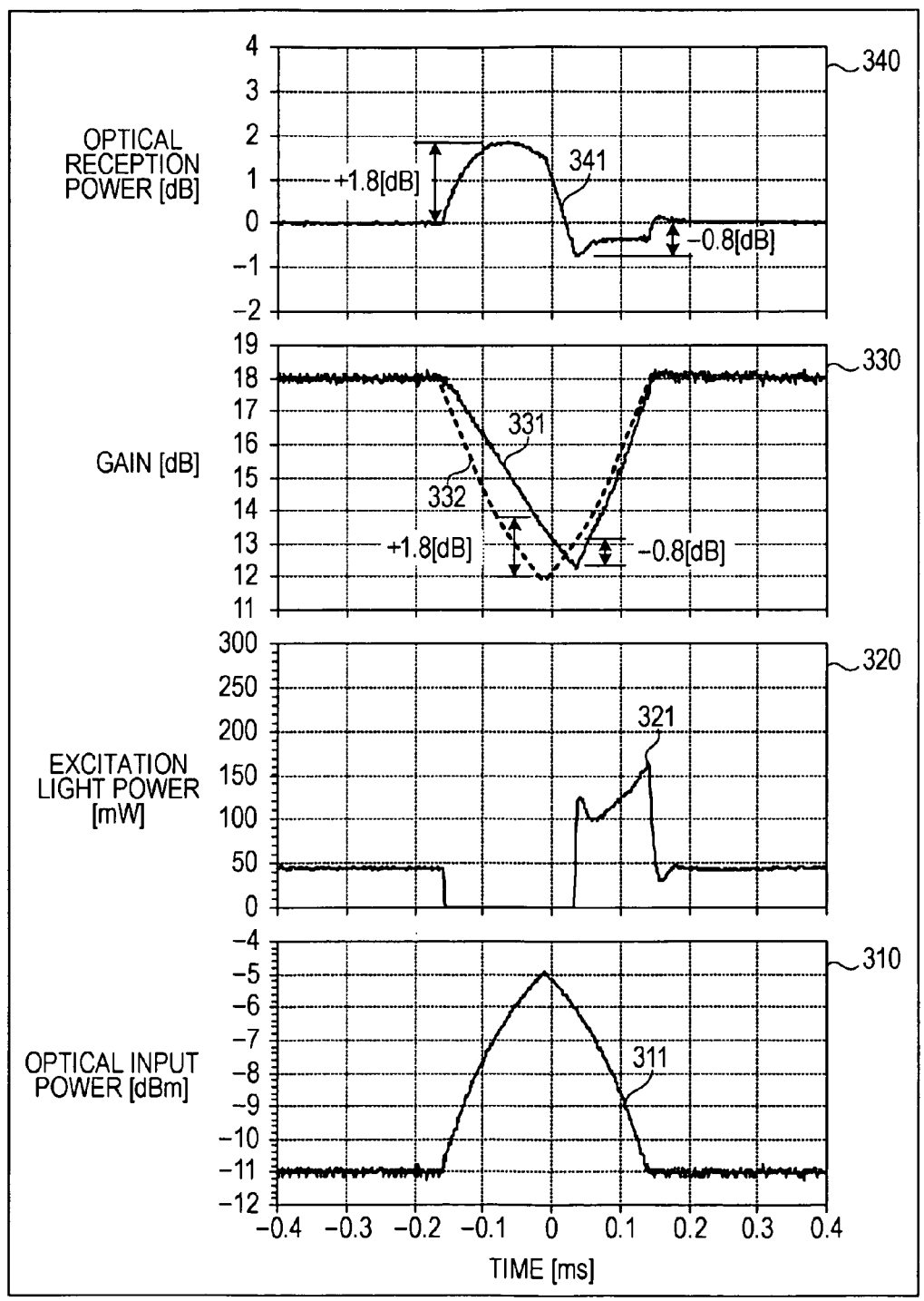
FIG. 7B illustrates example changes in characteristics occurring when an input power of a signal light having a wavelength of 1546.12 nm first increases and then returns to the original power.

FIG. 7A illustrates example changes in characteristics occurring when the input power of a signal light having a wavelength of 1528.77 nm first increases and then returns to the original power. FIG. 7B illustrates example changes in characteristics occurring when the input power of a signal light having a wavelength of 1546.12 nm first increases and then returns to the original power.

Figure 7C:
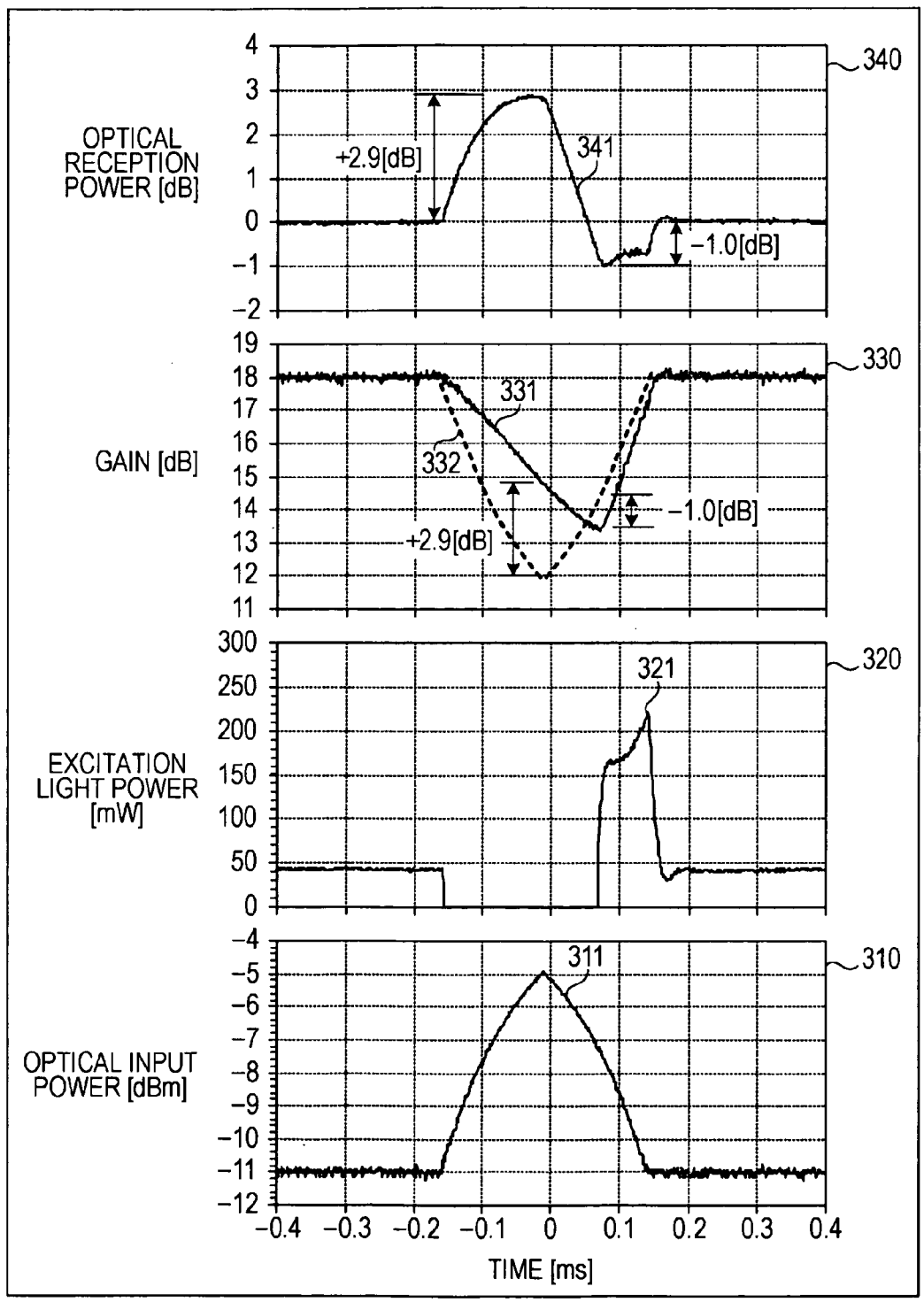
FIG. 7C illustrates example changes in characteristics occurring when an input power of a signal light having a wavelength of 1563.45 nm first increases and then returns to the original power.

FIG. 7C illustrates example changes in characteristics occurring when the input power of a signal light having a wavelength of 1563.45 nm first increases and then returns to the original power. In FIGS. 7A to 7C, the same reference numerals are used as in FIGS. 3A and 3B for similar parts, and the description thereof is omitted.

FIGS. 7A to 7C illustrate the example in which the optical input power of the optical receiving apparatus 100 according to the first embodiment increases from −11.0 dBm by 6 dB over 150 μs and then returns to the original power over 150 μs, as indicated by the optical input power change 311.

The changes in the characteristics when the wavelength of a signal light is 1528.77 nm, 1546.12 nm, and 1563.45 nm are illustrated in FIGS. 7A to 7C.

As indicated by the graph 330 in each of FIGS. 7A to 7C, the speed of the gain response 331 of the optical amplification medium 103 to a change in the excitation light power increases with a reduction in the wavelength of a signal light. Accordingly, a variation in the optical reception power of the optical receiver 106 may be reduced with a reduction in the wavelength of a signal light. Specifically, the optical reception power of the optical receiver 106 varies between +2.9 dB at the maximum and −1.0 dB at the minimum for the wavelength 1563.45 nm.

The optical reception power of the optical receiver 106 varies between +1.8 dB at the maximum and −0.8 dB at the minimum for the wavelength 1546.12 nm. The optical reception power of the optical receiver 106 varies between +0.6 dB at the maximum and −0.2 dB at the minimum for the wavelength 1528.77 nm.

Figure 8A:
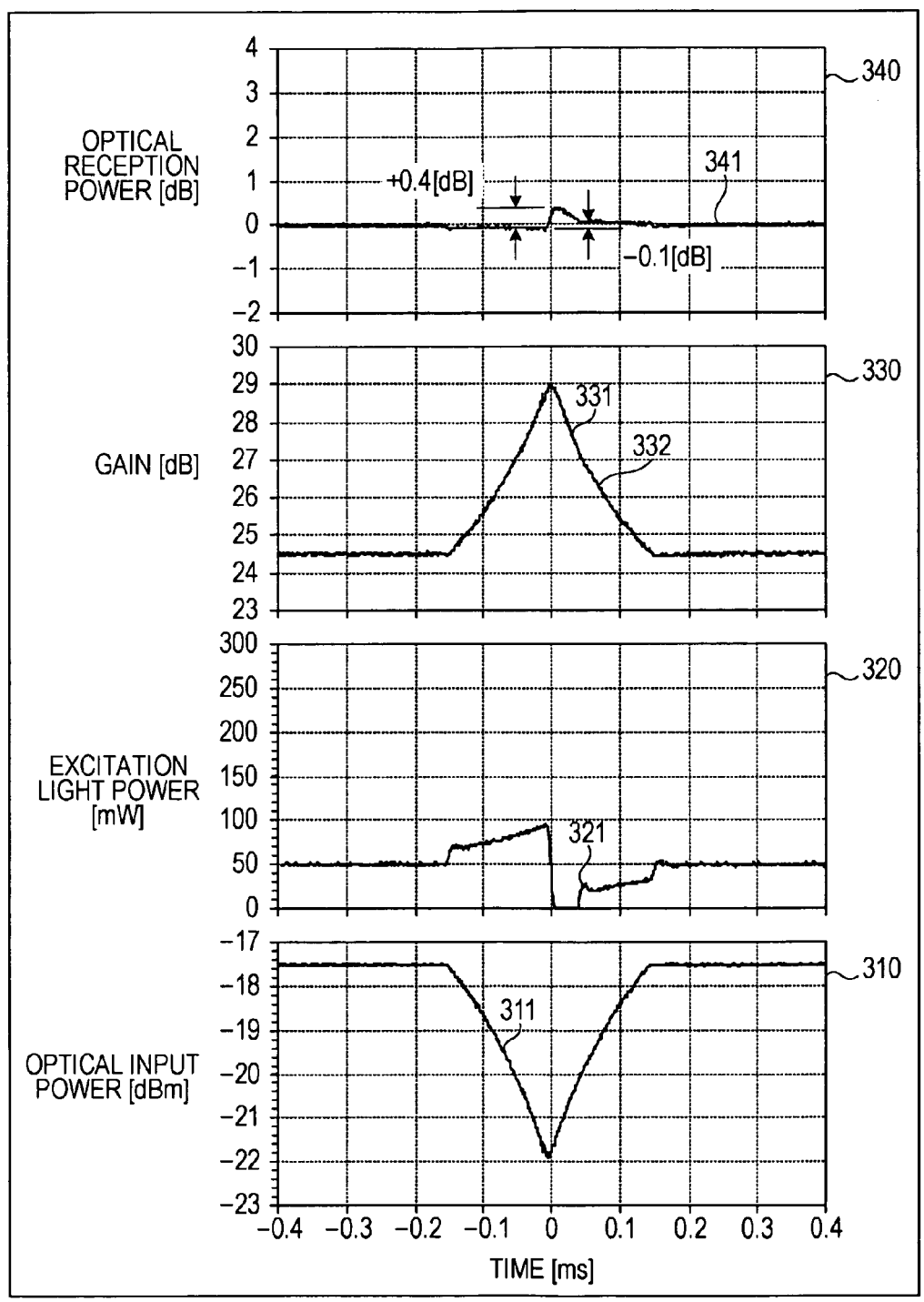
FIG. 8A illustrates example changes in characteristics occurring when an input power of a signal light having a wavelength of 1528.77 nm first decreases and then returns to the original power.
Figure 8B:
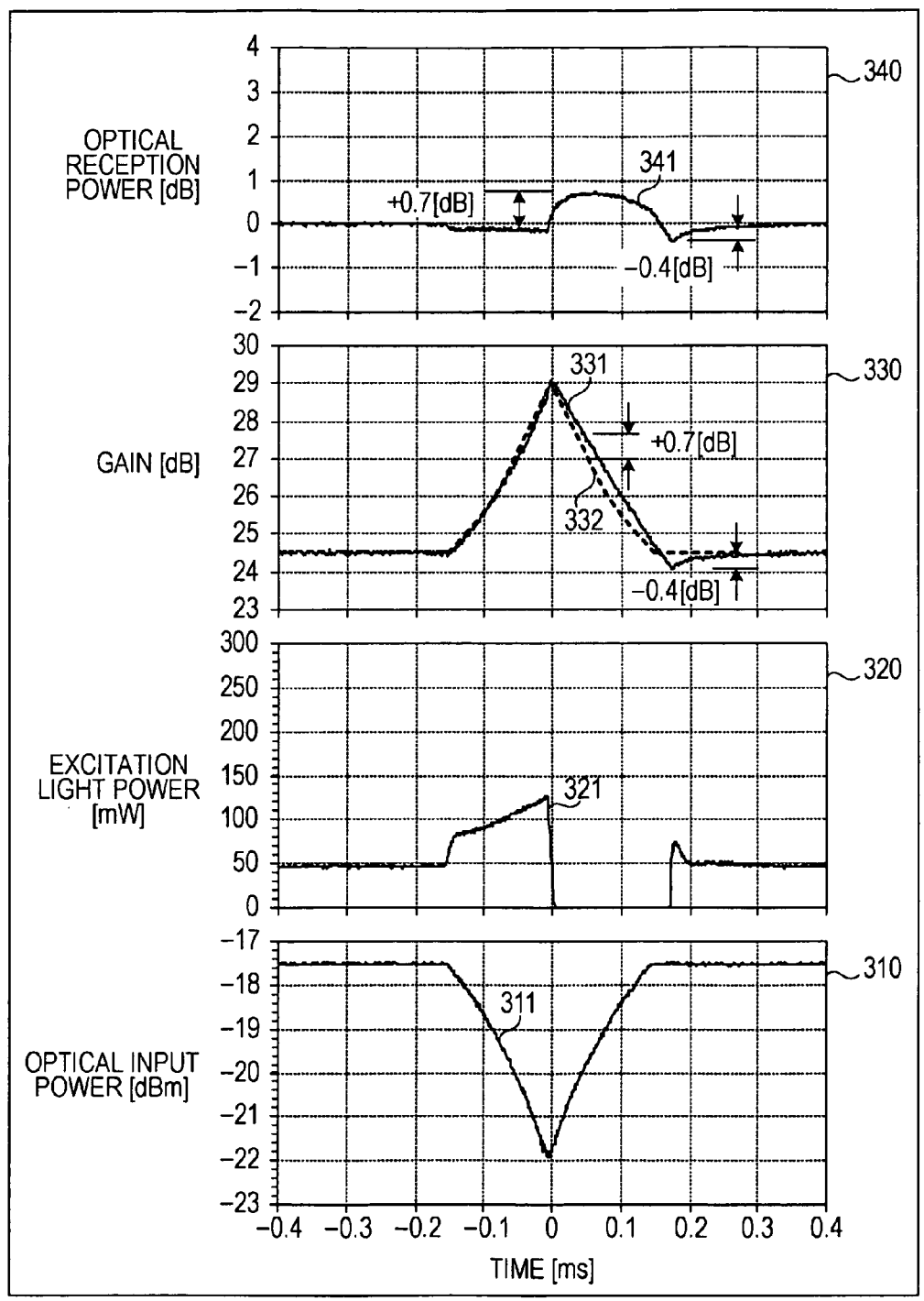
FIG. 8B illustrates example changes in characteristics occurring when an input power of a signal light having a wavelength of 1546.12 nm first decreases and then returns to the original power.

FIG. 8A illustrates example changes in characteristics occurring when the input power of a signal light having a wavelength of 1528.77 nm first decreases and then returns to the original power. FIG. 8B illustrates example changes in characteristics occurring when the input power of a signal light having a wavelength of 1546.12 nm first decreases and then returns to the original power.

Figure 8C:
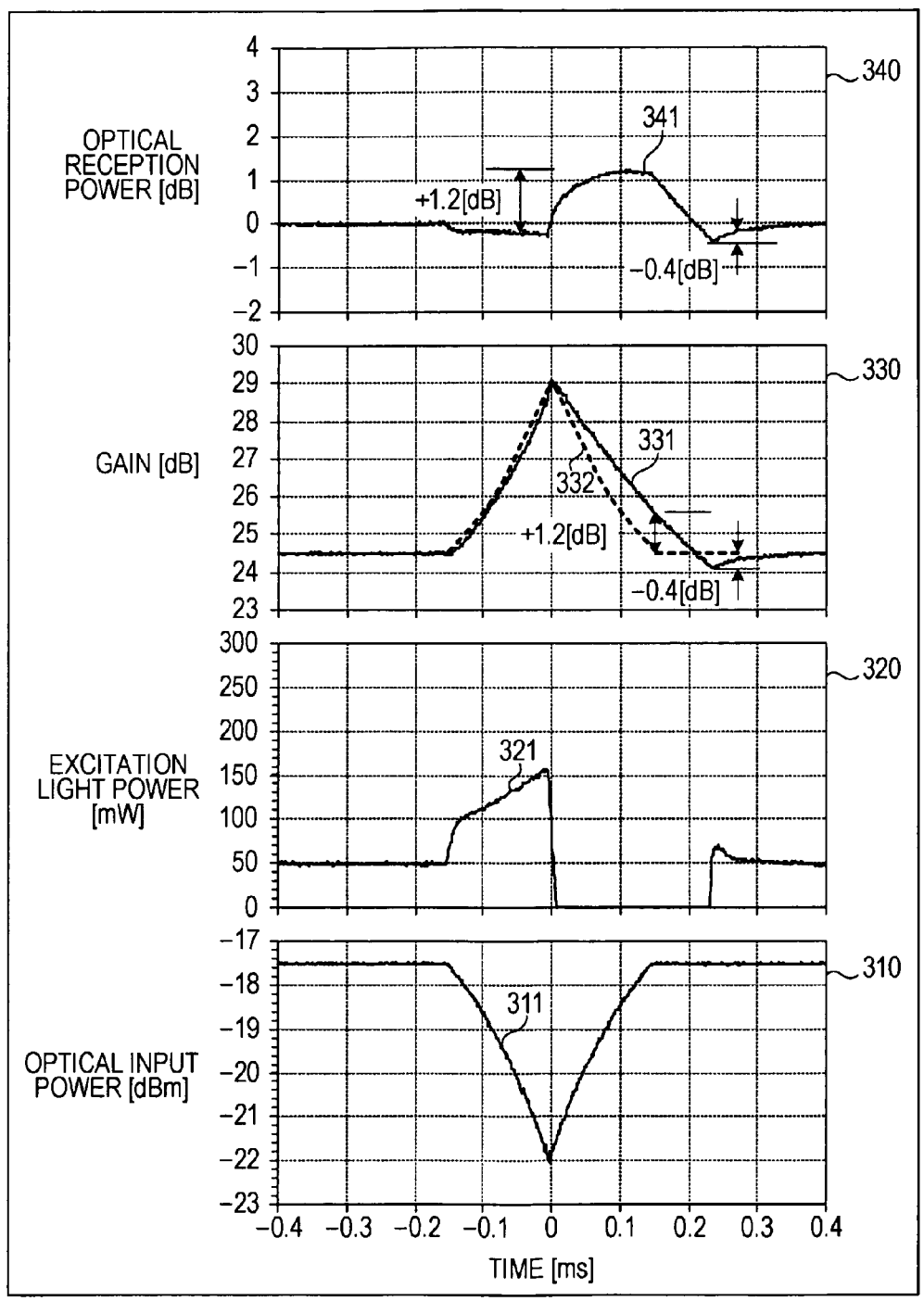
FIG. 8C illustrates example changes in characteristics occurring when an input power of a signal light having a wavelength of 1563.45 nm first decreases and then returns to the original power.

FIG. 8C illustrates example changes in characteristics occurring when the input power of a signal light having a wavelength of 1563.45 nm first decreases and then returns to the original power. In FIGS. 8A to 8C, the same reference numerals are used as in FIGS. 4A and 4B for similar parts, and the description thereof is omitted.

FIGS. 8A to 8C illustrate the example in which the optical input power of the optical receiving apparatus 100 according to the first embodiment decreases from −17.5 dBm by 4.5 dB over 150 μs and then returns to the original power over 150 μs. The changes in the characteristics when the wavelength of a signal light is 1528.77 nm, 1546.12 nm, and 1563.45 nm are illustrated in FIGS. 8A to 8C.

As indicated by the graph 330 in each of FIGS. 8A to 8C, the speed of the gain response 331 of the optical amplification medium 103 to a change in the excitation light power increases with a reduction in the wavelength of a signal light. Accordingly, a variation in the optical reception power of the optical receiver 106 may be reduced with a reduction in the wavelength of a signal light. Specifically, the optical reception power of the optical receiver 106 varies between +1.2 dB at the maximum and −0.4 dB at the minimum for the wavelength 1563.45 nm.

The optical reception power of the optical receiver 106 varies between +0.7 dB at the maximum and −0.4 dB at the minimum for the wavelength 1546.12 nm. The optical reception power of the optical receiver 106 varies between +0.4 dB at the maximum and −0.1 dB at the minimum for the wavelength 1528.77 nm.

For example, it is assumed that the tolerance of the optical input power of the optical receiver 106 is set at between +1.8 dB at the maximum and −1.0 dB at the minimum. In that case, as illustrated in FIGS. 7A to 7C and FIGS. 8A to 8C, a variation in the optical power of an optical signal with the wavelength 1528.77 nm is between +0.6 dB at the maximum and −0.3 dB at the minimum, so it is within the tolerance. In contrast, a variation in the optical power of an optical signal with the wavelength 1563.45 nm is between +2.9 dB at the maximum and −1.0 dB at the minimum, so it is out of the tolerance.

<Example Configuration of Optical Receiving Apparatus>

Figure 9:
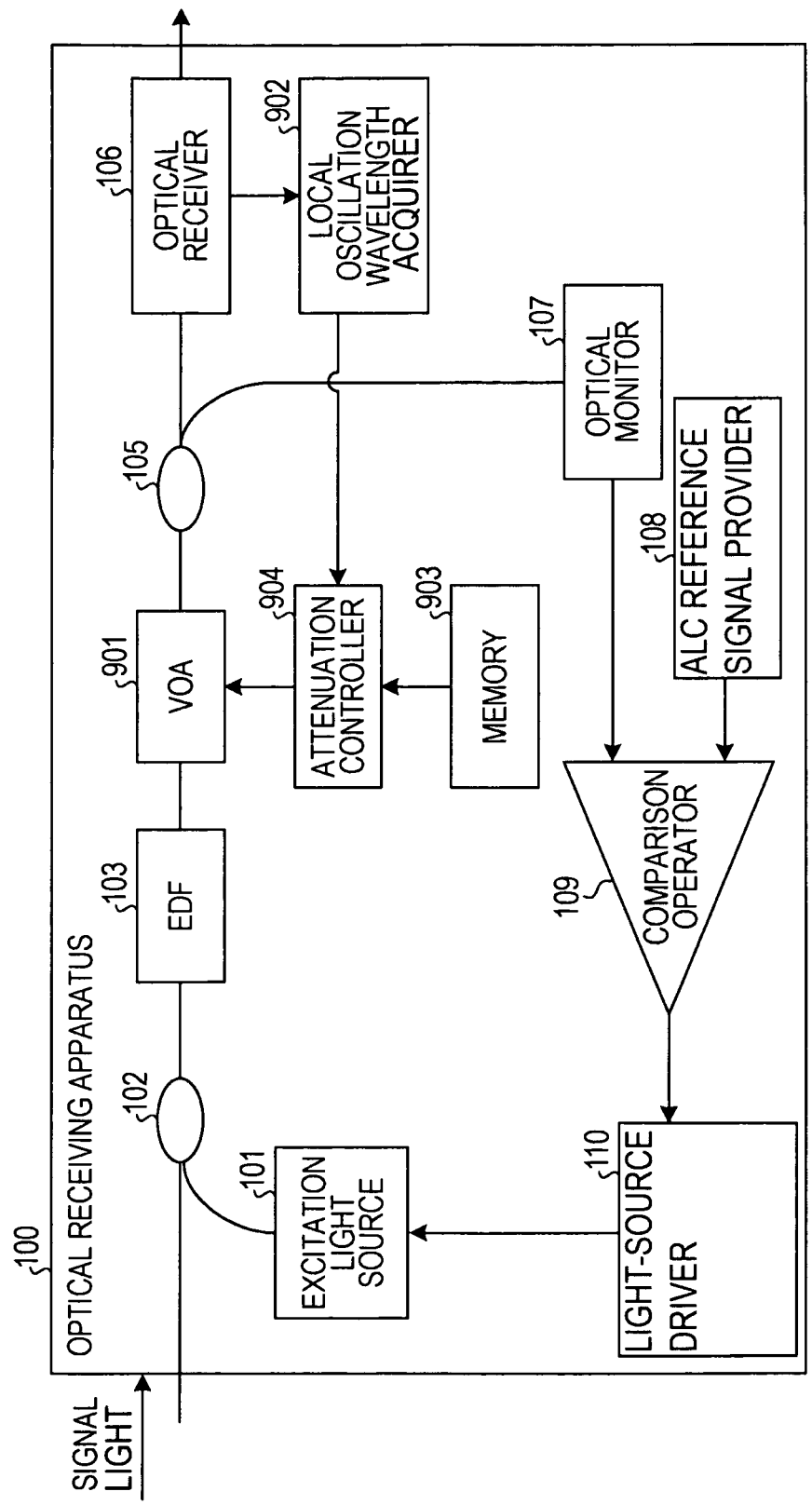
FIG. 9 illustrates an example configuration of an optical receiving apparatus according to a second embodiment.

FIG. 9 illustrates an example configuration of an optical receiving apparatus according to a second embodiment. In FIG. 9, the same reference numerals are used as in FIG. 1 for similar parts, and the description thereof is omitted. As illustrated in FIG. 9, the optical receiving apparatus 100 according to the second embodiment includes a variable optical attenuator (VOA) 901, a local oscillation wavelength acquirer 902, a memory 903, and an attenuation controller 904, instead of the optical loss medium 104 illustrated in FIG. 1.

No optical amplifier capable of generating an optical surge is disposed between the VOA and the optical receiver. Each of the local oscillation wavelength acquirer 902 and the attenuation controller 904 may include circuitry, or alternatively, may include one or more digital signal processors (DSPs) and/or one or more field programmable gate arrays (FPGAs).

The optical amplification medium 103 outputs a transmitted signal light to the VOA 901.

The VOA 901 is a variable optical attenuator that attenuates a signal light output from the optical amplification medium 103 by a variable attenuation (attenuation factor). The attenuation of the VOA 901 is controlled by the attenuation controller 904. Thus a variable optical loss may be provided to a signal light output from the optical amplification medium 103. Here, the optical receiver 106 is a coherent-detection optical receiver that receives a signal light using a local oscillation light.

The local oscillation wavelength acquirer 902 acquires, from the optical receiver 106, wavelength information indicating the wavelength $\lambda i2$ of a local oscillation light used for coherent detection in the optical receiver 106. The local oscillation wavelength acquirer 902 outputs the acquired wavelength information to the attenuation controller 904. The memory 903 stores correspondence information indicating associations between wavelengths and attenuations (e.g., expression and/or table).

The attenuation controller 904 controls the attenuation of the VOA 901 in accordance with wavelength information output from the local oscillation wavelength acquirer 902. Specifically, the attenuation controller 904 acquires the attenuation corresponding to the wavelength $\lambda i2$ of the local oscillation light indicated by the wavelength information output from the local oscillation wavelength acquirer 902 in accordance with the correspondence information stored in the memory 903. Then the attenuation controller 904 performs control such that the attenuation of the VOA 901 is the same as the acquired attenuation.

For example, when an optical signal having a wavelength at which the speed of the gain response of the optical amplification medium 103 is relatively low (long wavelength) is received, a relatively large attenuation is set in the VOA 901 to increase the speed of the gain response to a change in the excitation light power.

Thus the optical input power of the optical receiver 106 may be within the tolerance. In contrast, when an optical signal having a wavelength at which the speed of the gain response is relatively high (short wavelength) is received, a relatively small attenuation is set in the VOA 901. This may suppress the excitation light power and reduce the power consumption of the excitation light source 101.

The attenuation of each of the VOA 901 and the attenuation controller 904 may be changed according to the wavelength of a signal light, for example. Accordingly, the attenuation response characteristic may be slower than that in a configuration that changes the attenuation in accordance with the power of a signal light. Thus each of the VOA 901 and the attenuation controller 904 may be made using an inexpensive component.

<Coherent-Detection Optical Receiver>

Figure 10:
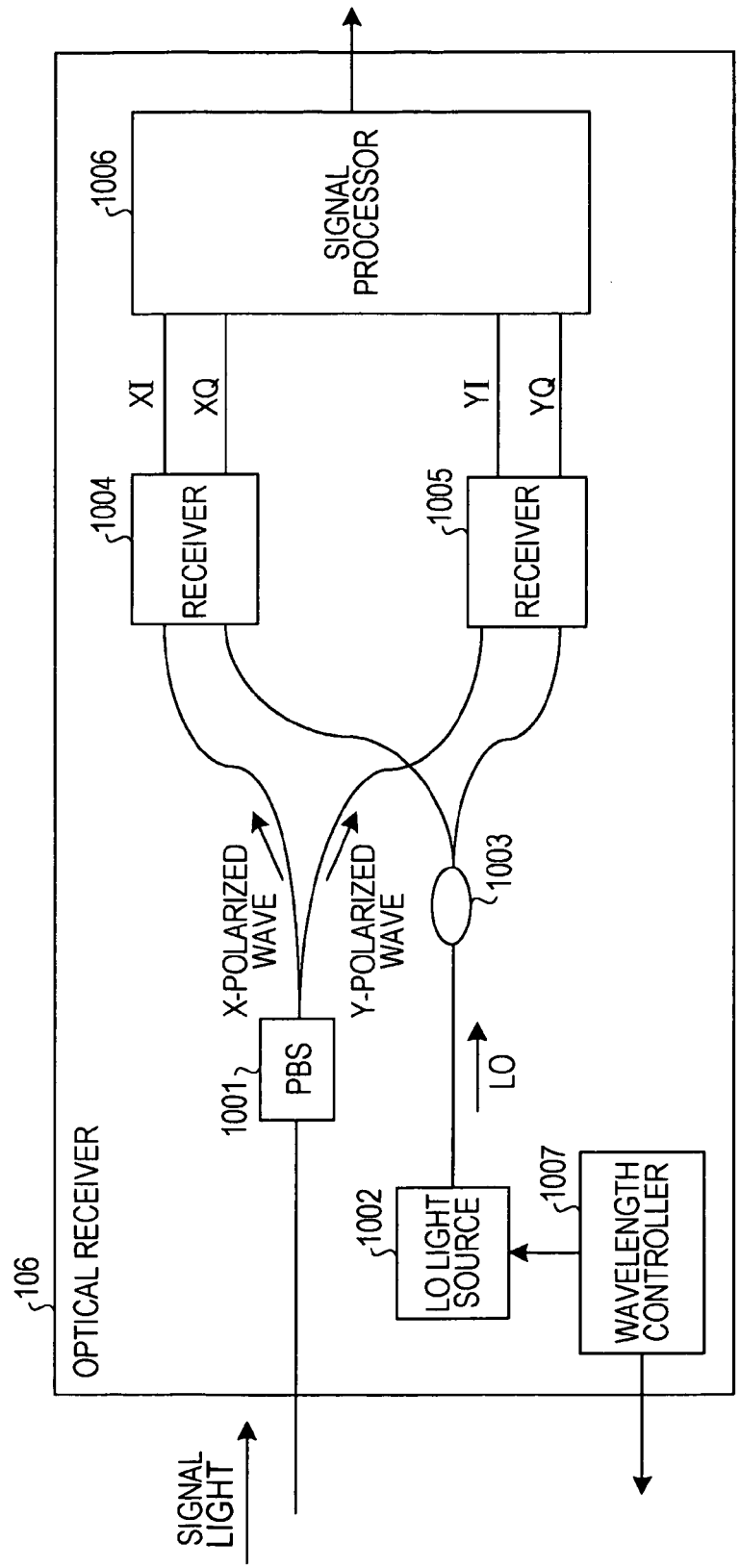
FIG. 10 illustrates an example of a coherent-detection optical receiver according to the second embodiment.

FIG. 10 illustrates an example of a coherent-detection optical receiver according to the second embodiment. One example of the coherent detection is dual polarization-quadrature phase shift keying (DP-QPSK). The optical receiver 106 of the DP-QPSK type (coherent receiver) is described below as an example.

As illustrated in FIG. 10, the optical receiver 106 includes a polarization light splitter (PBS) 1001, a local oscillation (LO) light source 1002, a light splitter 1003, a receiver 1004, a receiver 1005, a signal processor 1006, and a wavelength controller 1007. Each of the receiver 1004, the receiver 1005, the signal processor 1006, and the wavelength controller 1007 may include circuitry, or alternatively, may include one or more digital signal processors (DSPs) and/or one or more field programmable gate arrays (FPGAs).

A signal light (wavelength $\lambda i$) input into the optical receiver 106 is the one in which two orthogonal polarization components (referred to as X-polarized wave and Y-polarized wave) are polarization-multiplexed. The PBS 1001 splits the signal light input into the optical receiver 106 in accordance with the polarization.

The PBS 1001 outputs an X-polarized wave signal light out of the split signal lights to the receiver 1004. The PBS 1001 outputs a Y-polarized wave signal light out of the split signal lights to the receiver 1005.

The LO light source 1002 generates a local oscillation light (LO) and outputs it to the light splitter 1003.

The light splitter 1003 splits the local oscillation light output from the LO light source 1002. The light splitter 1003 outputs a first one of the split local oscillation lights to the receiver 1004. The light splitter 1003 outputs a second one of the spilt local oscillation lights to the receiver 1005.

The receiver 1004 receives the X-polarized wave signal light output from the PBS 1001 by coherent detection using the local oscillation light output from the light splitter 1003. Specifically, the receiver 1004 causes the signal light and the local oscillation light to interfere with each other (mixes them) in accordance with the optical phase and converts the signal light into an electric signal XI, the electric signal XI being the in-phase interference component, and an electric signal XQ, the electric signal XQ being the orthogonal interference component. The receiver 1004 outputs the electric signals XI and XQ to the signal processor 1006.

The receiver 1005 receives the Y-polarized wave signal light output from the PBS 1001 by coherent detection using the local oscillation light output from the light splitter 1003. Specifically, the receiver 1005 causes the signal light and the local oscillation light to interfere with each other (mixes them) in accordance with the optical phase and converts the signal light into an electric signal YI, the electric signal YI being the in-phase interference component, and an electric signal YQ, the electric signal YQ being the orthogonal interference component. The receiver 1005 outputs the electric signals YI and YQ to the signal processor 1006.

The signal processor 1006 converts the electric signals XI and XQ output from the receiver 1004 into information signals by given signal processing. The signal processor 1006 also converts the electric signals YI and YQ output from the receiver 1005 into information signals by given signal processing. Examples of the signal processing carried out by the signal processor 1006 may include demodulation and error detection.

The wavelength controller 1007 performs controls such that the wavelength of the local oscillation light output from the LO light source 1002 is matches with the wavelength λi1 of the signal light received by the optical receiver 106. Accordingly, the wavelength λi2 of the local oscillation light output from the LO light source 1002 is substantially equal to the wavelength λi1 of the signal light received by the optical receiver 106. The wavelength controller 1007 outputs wavelength information indicating the wavelength λi2 of the local oscillation light to the local oscillation wavelength acquirer 902.

<Receiving Station in which Optical Receiving Apparatuses are Used>

Figure 11:
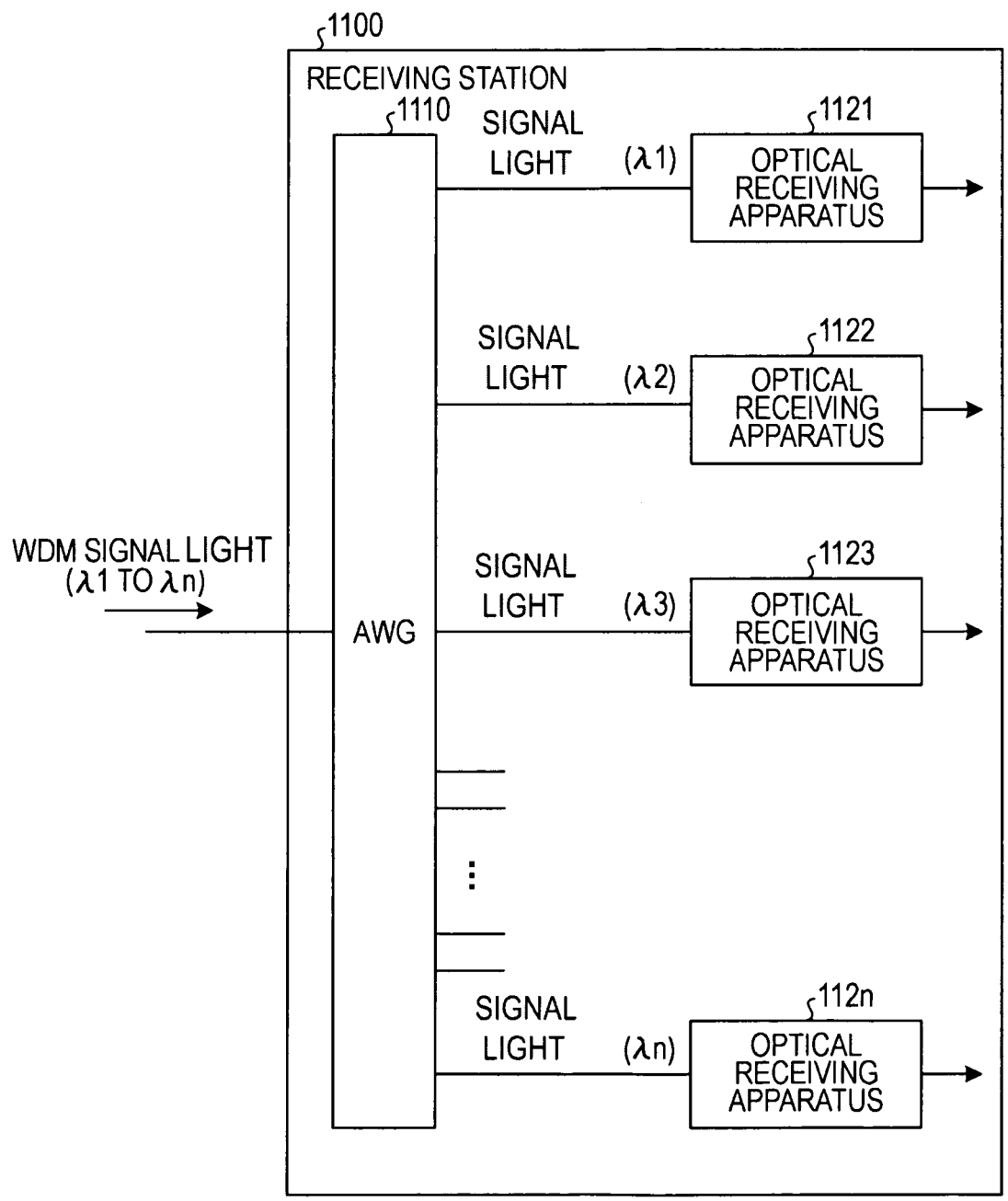
FIG. 11 illustrates an example of a receiving station in which the optical receiving apparatuses according to the second embodiment are used.

FIG. 11 illustrates an example receiving station in which the optical receiving apparatuses according to the second embodiment are used.

A receiving station 1100 illustrated in FIG. 11 is an example of a receiving station in a WDM optical transmission system.

The receiving station 1100 receives a WDM signal light in which signal lights having wavelengths λ1 to λn (n=1, 2, 3, . . . ) are wavelength-multiplexed. Specifically, the receiving station 1100 includes an arrayed waveguide grating (AWG) 1110 and optical receiving apparatuses 1121 to 112n.

The AWG 1110 is a light splitter that splits a WDM signal light input into the receiving station 1100 in accordance with the wavelength. The AWG 1110 outputs the split signal lights having the wavelengths λi to λn to the optical receiving apparatuses 1121 to 112n, respectively. Each of the optical receiving apparatuses 1121 to 112n receives the signal light output from the AWG 1110.

The optical receiving apparatus 100 illustrated in FIG. 9 may be used in each of the optical receiving apparatuses 1121 to 112n, for example. Each of the optical receiving apparatuses 1121 to 112n may suppress a variation in the optical reception power of the optical receiver 106, improve the reception characteristic, and suppress the power consumption of the excitation light source 101. Alternatively, the optical receiving apparatus 100 according to another embodiment, for example, illustrated in FIG. 1, 19, 23, or 26, may also be used in each of the optical receiving apparatuses 1121 to 112n.

<Relationship Between Wavelength of Optical Signal and Variation Characteristic of Optical Reception Power>

Figure 12A:
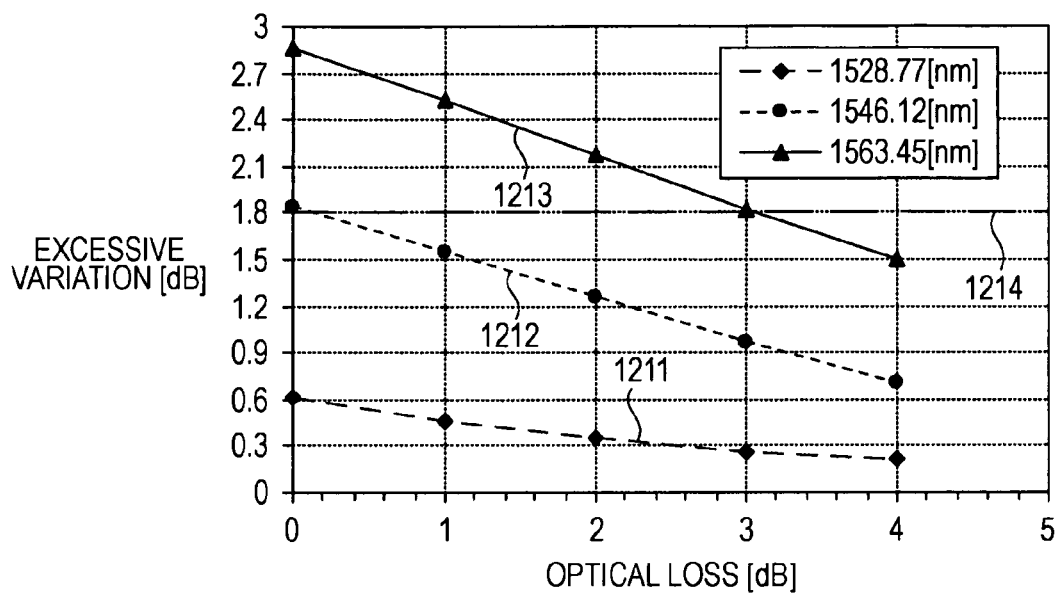
FIG. 12A illustrates the relationship between the wavelength of an optical signal and the excessive variation characteristic of an optical reception power.
Figure 12B:
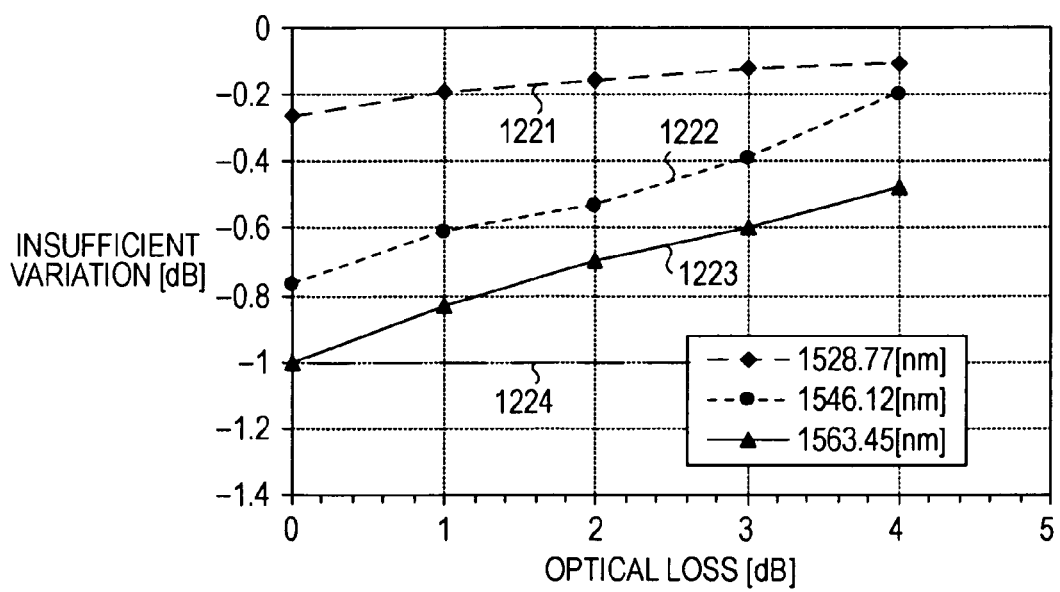
FIG. 12B illustrates the relationship between the wavelength of an optical signal and the insufficient variation characteristic of an optical reception power.

FIG. 12A is a graph that illustrates the relationship between the wavelength of an optical signal and the excessive variation characteristic of an optical reception power. FIG. 12B is a graph that illustrates the relationship between the wavelength of an optical signal and the insufficient variation characteristic of an optical reception power. The horizontal axis in each of FIGS. 12A and 12B represents the optical loss (attenuation) in dB set in the VOA 901.

The vertical axis in FIG. 12A represents a variation in dB in the optical reception power of the optical receiver 106 to an excessive power (excessive variation). Excessive variation characteristics 1211 to 1213 represent the excessive variation characteristics of the optical reception power of the optical receiver 106 to the optical loss of the VOA 901 when the wavelength of the signal light is 1528.77 nm, 1546.12 nm, and 1563.45 nm, respectively.

The vertical axis in FIG. 12B represents a variation in dB in the optical reception power of the optical receiver 106 to an insufficient power (insufficient variation). Insufficient variation characteristics 1221 to 1223 represent the insufficient variation characteristics of the optical reception power of the optical receiver 106 to the optical loss of the VOA 901 when the wavelength of the signal light is 1528.77 nm, 1546.12 nm, and 1563.45 nm, respectively.

FIGS. 12A and 12B illustrate the example in which the optical input power of the optical receiving apparatus 100 increases from −11.0 dBm by 6 dB over 150 μs and then returns to the original power over 150 μs. A threshold 1214 in FIG. 12A is the maximum value in the tolerance of the optical reception power of the optical receiver 106.

Here, the threshold 1214 indicates +1.8 dB. A threshold 1224 in FIG. 12B is the minimum value in the tolerance of the optical reception power of the optical receiver 106. Here, the threshold 1224 indicates −1.0 dB.

As illustrated in FIGS. 12A and 12B, when the wavelength of the signal light is 1528.77 nm, an optical loss of 0 dB of the VOA 901 enables the variation in the optical reception power of the optical receiver 106 to be within the tolerance and also enables the power consumption to be suppressed. When the wavelength of the signal light is 1546.12 nm, an optical loss of 1 dB of the VOA 901 enables the variation in the optical reception power of the optical receiver 106 to be within the tolerance and also enables the power consumption to be suppressed. When the wavelength of the signal light is 1563.45 nm, an optical loss of 4 dB of the VOA 901 enables the variation in the optical reception power of the optical receiver 106 to be within the tolerance.

Accordingly, the memory 903 may store correspondence information indicating the associations between the wavelength 1528.77 nm and the optical loss 0 dB, between the wavelength 1546.12 nm and the optical loss 1 dB, and between the wavelength 1563.45 nm and the optical loss 4 dB.

In this way, in the correspondence information in the memory 903, each wavelength may be associated with the minimum value of the optical loss at which the variation in the optical reception power of the optical receiver 106 may be within the tolerance.

Therefore, the variation in the optical reception power of the optical receiver 106 may be within the tolerance, while at the same time the power consumption of the excitation light source 101 may be suppressed.

<Example of Correspondence Information>

Figure 13:
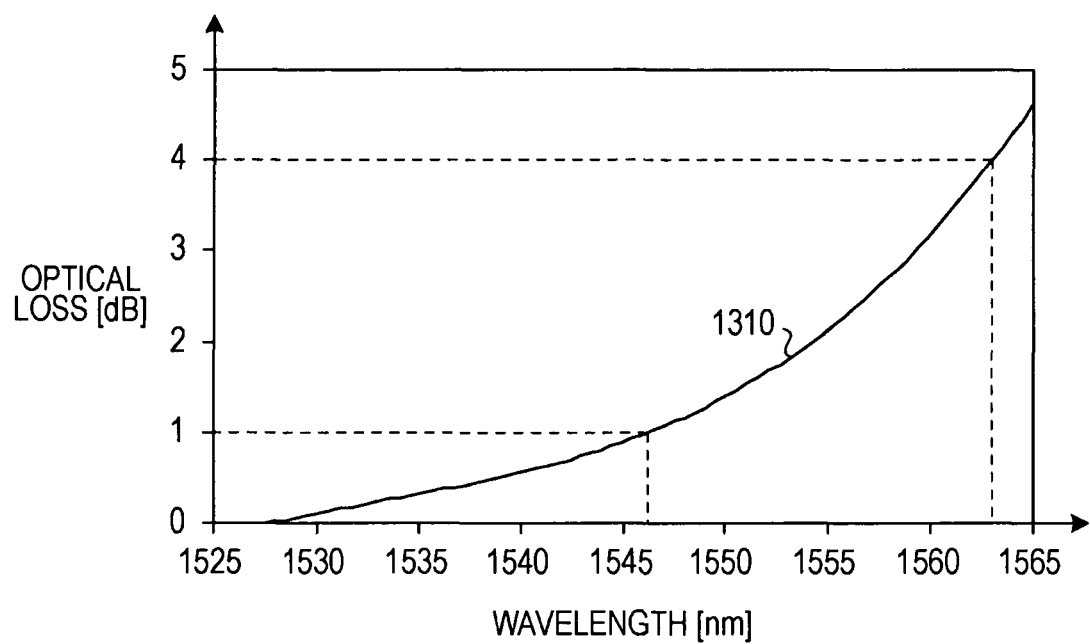
FIG. 13 illustrates the relationship between a wavelength and an optical loss indicated by correspondence information.

FIG. 13 is a graph that illustrates the relationship between a wavelength and an optical loss indicated by correspondence information. In FIG. 13, the horizontal axis represents the wavelength in nm of a signal light, and the vertical axis represents the optical loss (attenuation) in dB of the VOA 901. A relationship 1310 represents the relationship (correlation) between the wavelength of a signal light and the optical loss of the VOA 901 at which the variation in the optical reception power may be within the tolerance.

For example, the relationship 1310 may have correlations between the wavelength 1528.77 nm and the optical loss 0 dB, between the wavelength 1546.12 nm and the optical loss 1 dB, and between the wavelength 1563.45 nm and the optical loss 4 dB. For example, the relationship 1310 may be approximated by the cubic function represented by the following expression (1). In the following expression (1), Loss denotes the optical loss set in the VOA 901, a3, a2, a1, and a0 denote coefficients, and λi denotes the wavelength of a signal light.

$$\text{Loss} = a3 \times \lambda i^3 + a2 \times \lambda i^2 + a1 \times \lambda i + a0 \quad (1)$$

The expression (1) and the coefficients a3, a2, a1, and a0 may be stored in the memory 903 as correspondence information, for example. The attenuation controller 904 calculates the optical loss "Loss" in accordance with wavelength information output from the local oscillation wavelength acquirer 902 and the expression (1) and the coefficients a3, a2, a1, and a0 stored in the memory 903. The attenuation controller 904 sets the calculated optical loss "Loss" in the VOA 901.

Here, the wavelength λi2 of the local oscillation light indicated by the wavelength information is substantially equal to the wavelength λi1 of the signal light. Therefore, the attenuation controller 904 calculates the optical loss "Loss" by using the wavelength λi2 of the local oscillation light indicated by the wavelength information as the wavelength λi in the expression (1).

FIG. 14 illustrates an example of a table in which a wavelength and an optical loss are associated with each other. A table 1400 in FIG. 14 is one example of the table illustrating the relationship 1310 in FIG. 13. In the table 1400, the wavelength in nm of a signal light and the optical loss in dB of the VOA 901 are associated with each other.

The memory 903 may store the table 1400 as the correspondence information, for example. The attenuation controller 904 acquires the optical loss corresponding to the wavelength indicated by wavelength information output from the local oscillation wavelength acquirer 902 from the table 1400 and sets the acquired optical loss in the VOA 901.

<Process of Setting Optical Loss>

Figure 15:
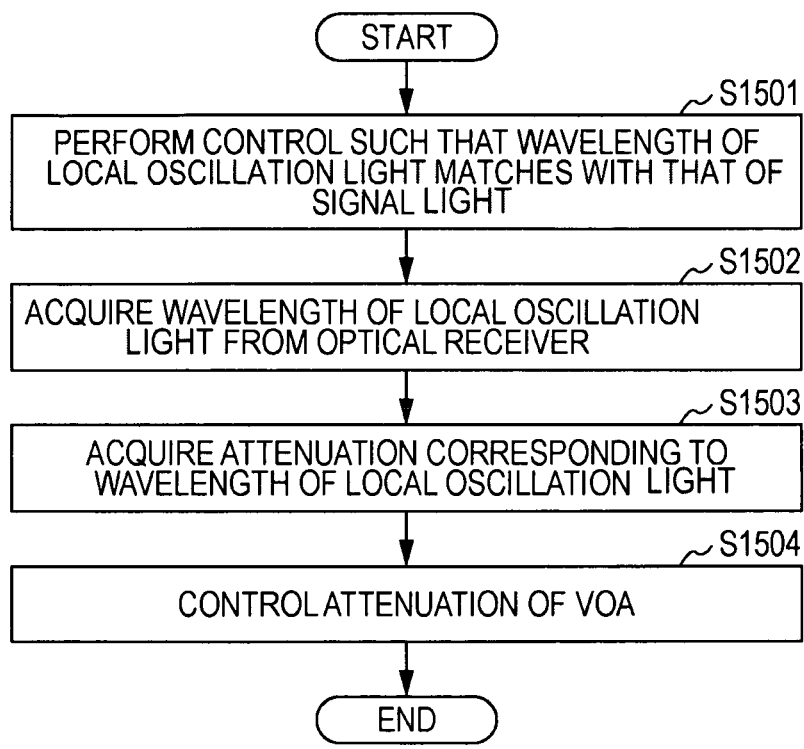
FIG. 15 illustrates an example process of setting an optical loss according to the second embodiment.

FIG. 15 illustrates an example process of setting an optical loss according to the second embodiment. The optical receiving apparatus 100 according to the second embodiment may control the optical loss of the VOA 901 by executing operations illustrated in FIG. 15, for example.

First, the wavelength controller 1007 of the optical receiver 106 performs control such that the wavelength λi2 of the local oscillation light output from the LO light source 1002 matches with the wavelength λi1 of the signal light (operation S1501). Then, the local oscillation wavelength acquirer 902 acquires the wavelength λi2 of the local oscillation light controlled in operation S1501 from the optical receiver 106 (operation S1502).

Then, the attenuation controller 904 acquires the optical loss (attenuation) corresponding to the wavelength λi2 of the local oscillation light acquired in operation S1502 in accordance with correspondence information stored in the memory 903 (operation S1503).

Then, the attenuation controller 904 performs control such that the optical loss (attenuation) of the VOA 901 is the same as the optical loss acquired in operation S1503 (operation S1504), and the process is completed. The operations described above enable the optical loss corresponding to the wavelength λi1 of the signal light to be set in the excitation light source 101.

<Changes in Characteristics Occurring when Optical Input Power Varies for Each Signal Wavelength>

Figure 16A:
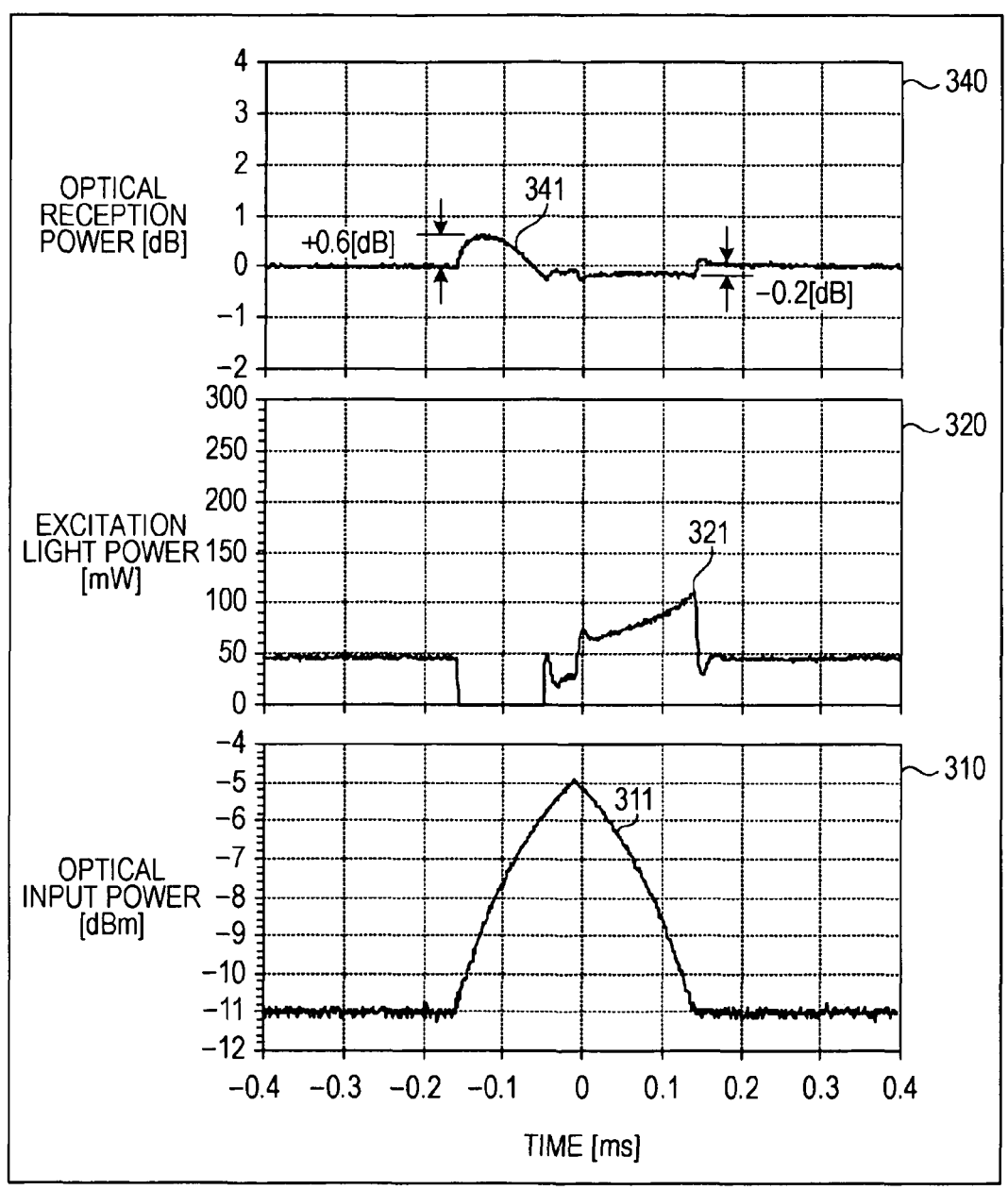
FIG. 16A illustrates example changes in characteristics occurring when an input power of a signal light having a wavelength of 1528.77 nm first increases and then returns to the original power.
Figure 16B:
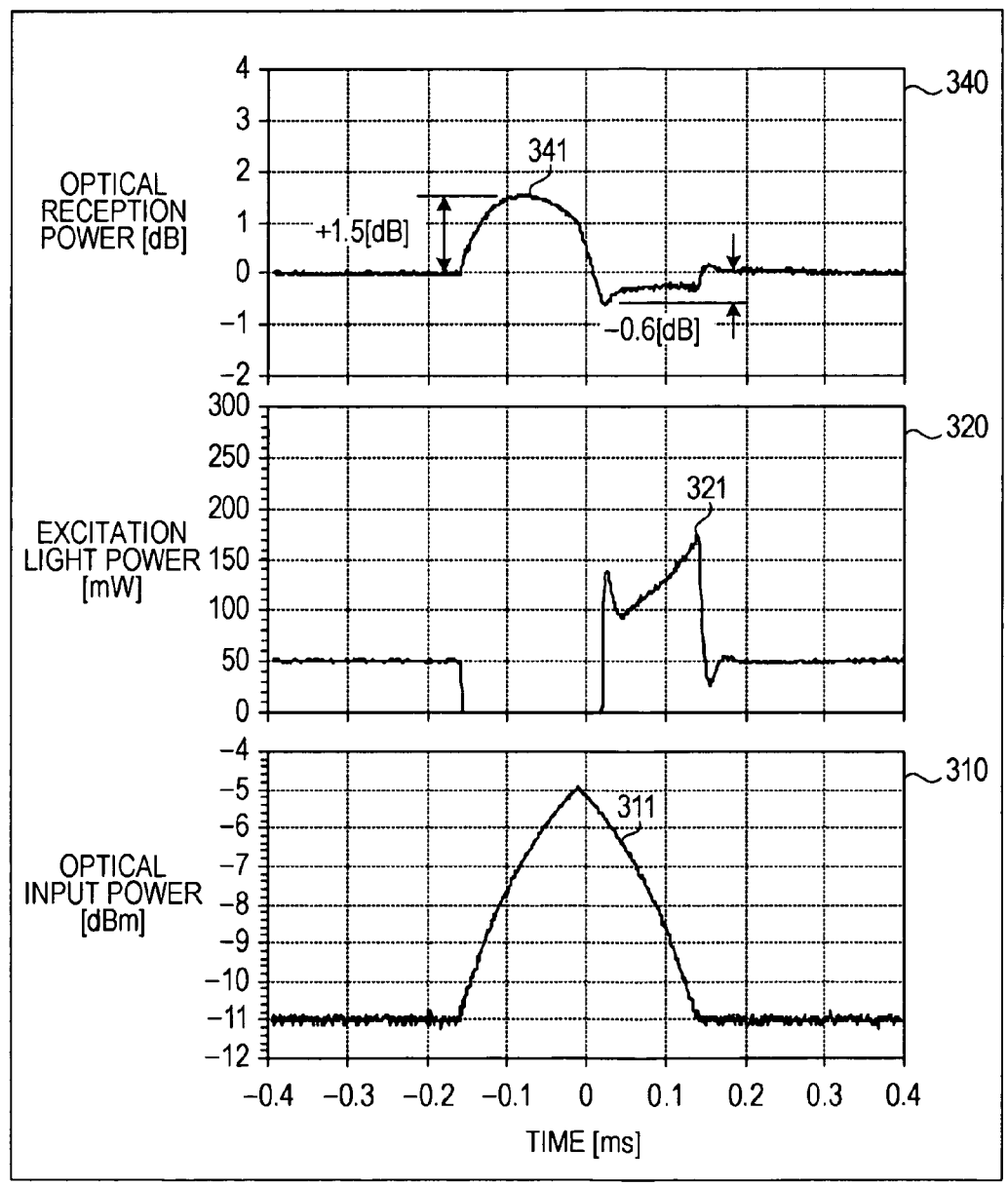
FIG. 16B illustrates example changes in characteristics occurring when an input power of a signal light having a wavelength of 1546.12 nm first increases and then returns to the original power.

FIG. 16A illustrates example changes in characteristics occurring when the input power of a signal light having a wavelength of 1528.77 nm first increases and then returns to the original power. FIG. 16B illustrates example changes in characteristics occurring when the input power of a signal light having a wavelength of 1546.12 nm first increases and then returns to the original power.

Figure 16C:
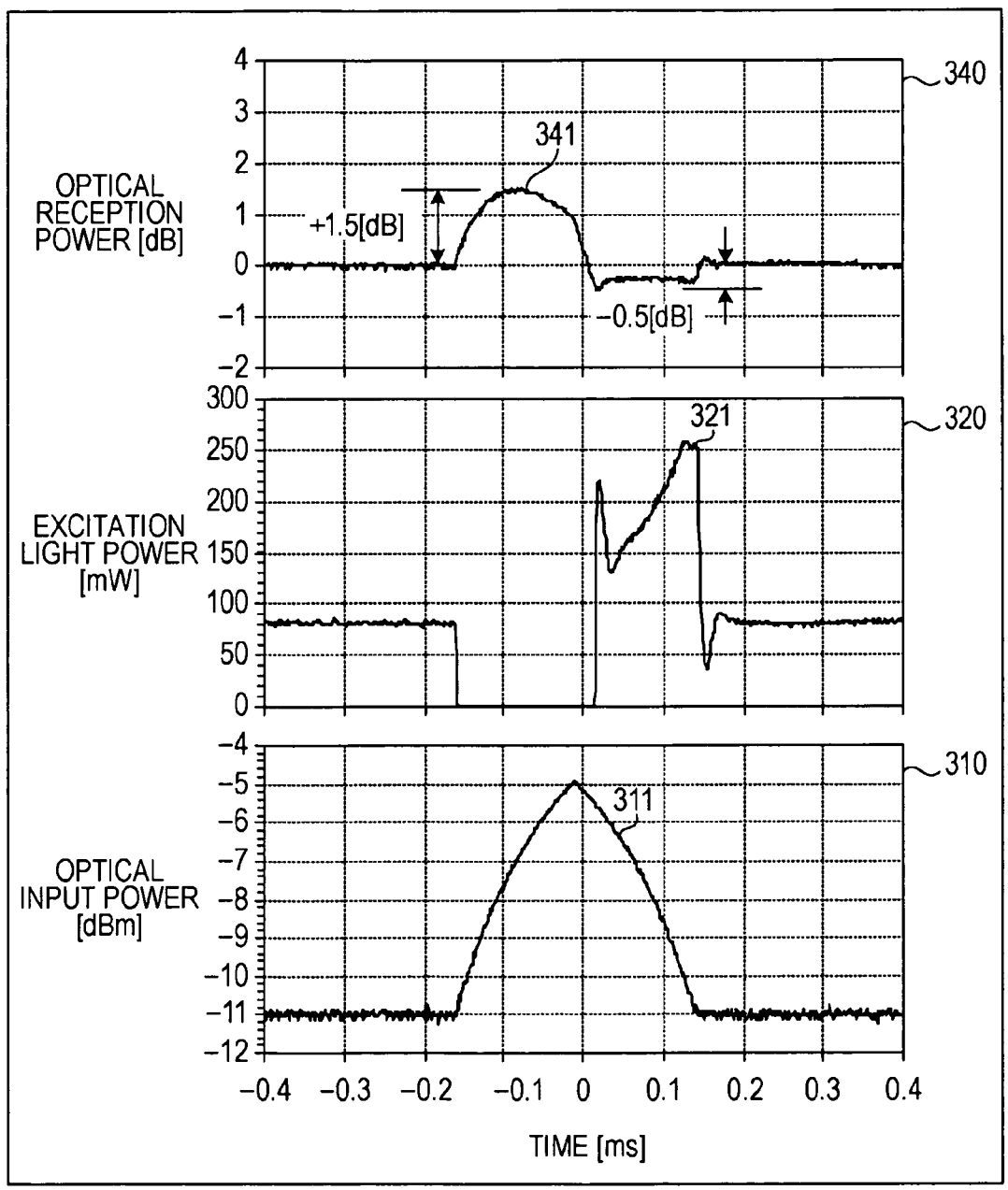
FIG. 16C illustrates example changes in characteristics occurring when an input power of a signal light having a wavelength of 1563.45 nm first increases and then returns to the original power.

FIG. 16C illustrates example changes in characteristics occurring when the input power of a signal light having a wavelength of 1563.45 nm first increases and then returns to the original power. In FIGS. 16A to 16C, the same reference numerals are used as in FIGS. 7A to 7C for similar parts, and the description thereof is omitted.

FIGS. 16A to 16C illustrate the example in which the optical input power of the optical receiving apparatus 100 according to the second embodiment increases from −11.0 dBm by 6 dB over 150 μs and then returns to the original power over 150 μs. In the example input into FIGS. 16A to 16C, in accordance with the relationship 1310 illustrated in FIG. 13, the attenuations 0 dB, 1 dB, and 4 dB are set for the wavelengths 1528.77 nm, 1546.12 nm, and 1563.45 nm, respectively.

Figure 17A:
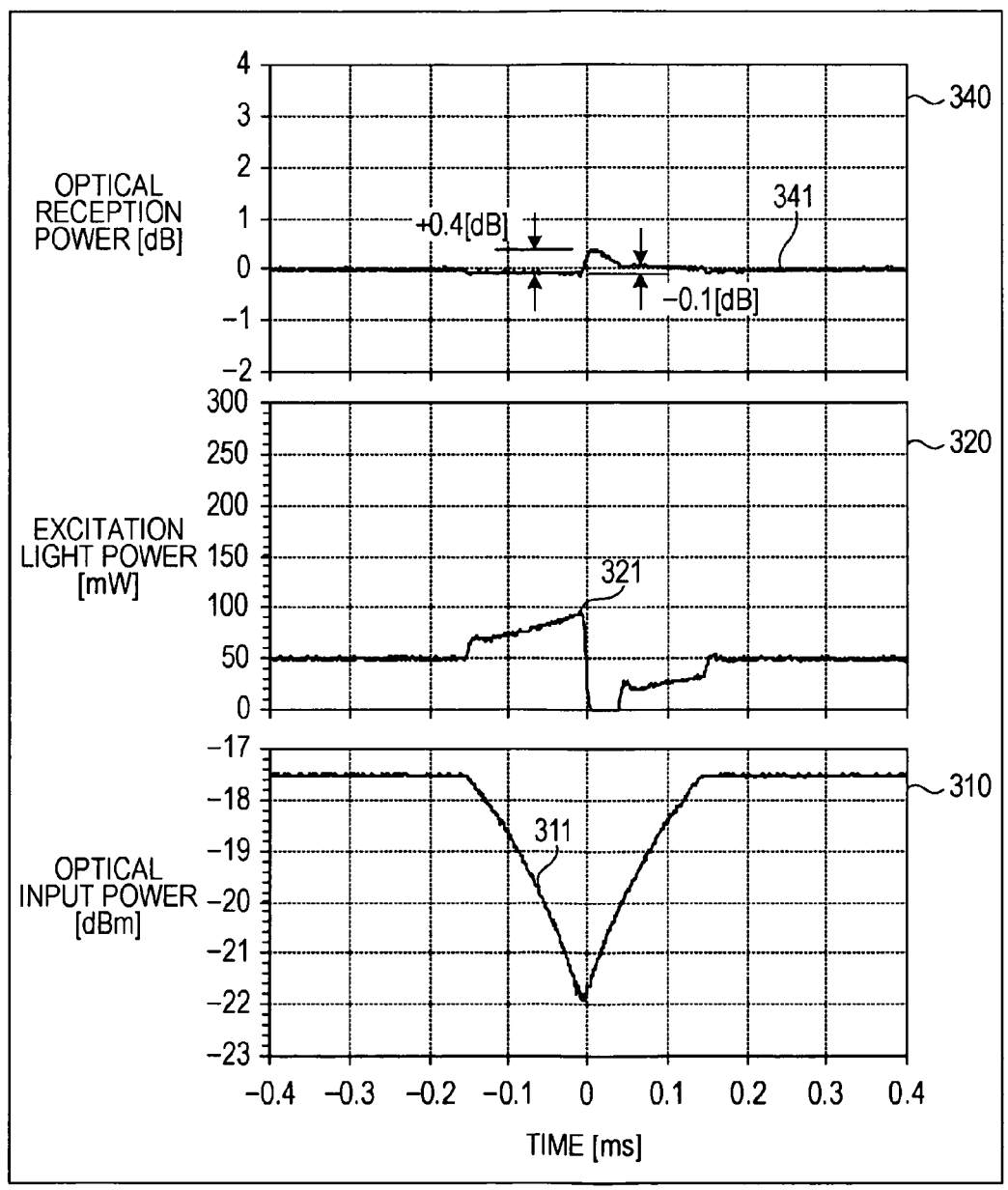
FIG. 17A illustrates example changes in characteristics occurring when an input power of a signal light having a wavelength of 1528.77 nm first decreases and then returns to the original power.
Figure 17B:
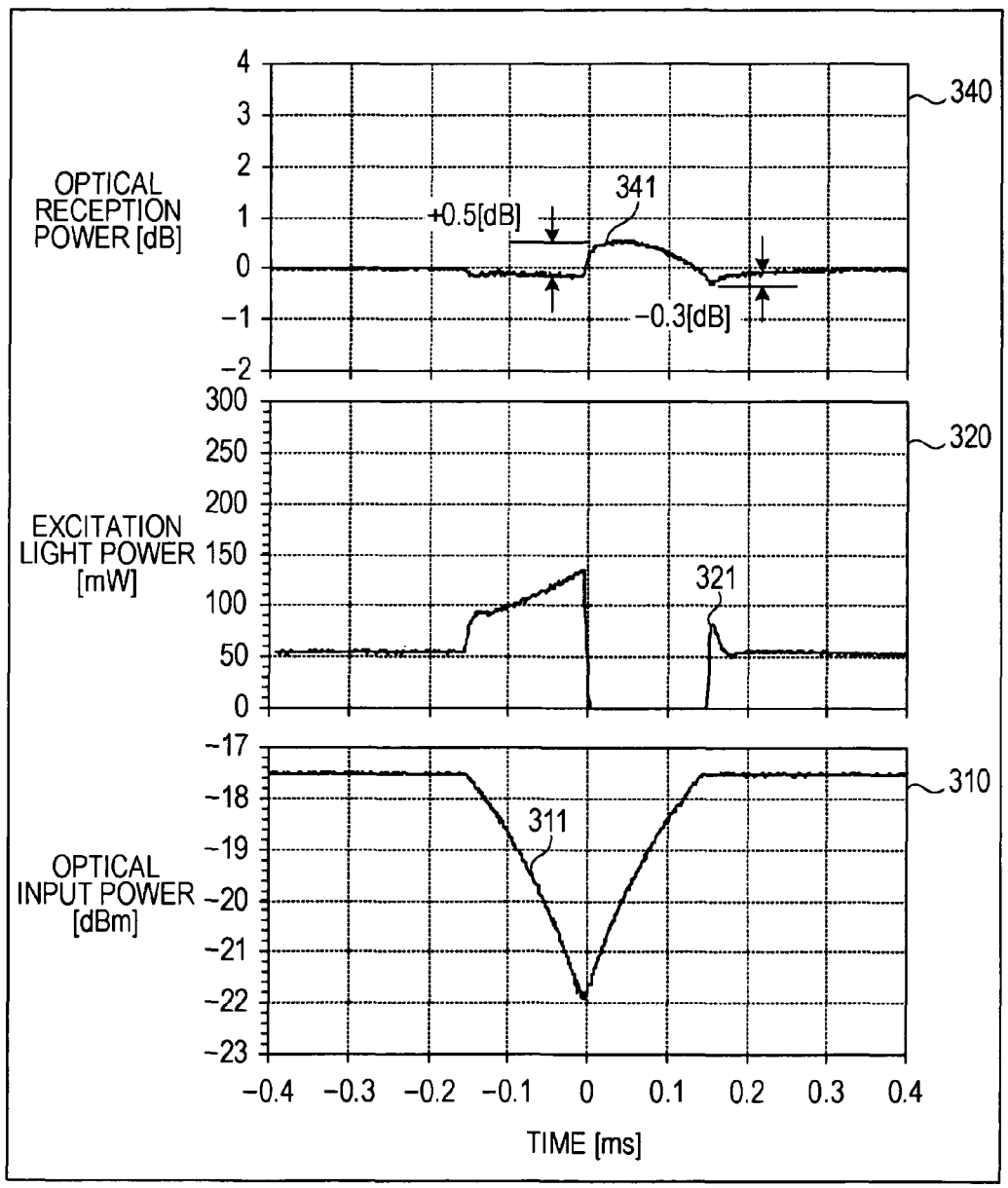
FIG. 17B illustrates example changes in characteristics occurring when an input power of a signal light having a wavelength of 1546.12 nm first decreases and then returns to the original power.

FIG. 17A illustrates example changes in characteristics occurring when the input power of a signal light having a wavelength of 1528.77 nm first decreases and then returns to the original power. FIG. 17B illustrates example changes in characteristics occurring when the input power of a signal light having a wavelength of 1546.12 nm first decreases and then returns to the original power.

Figure 17C:
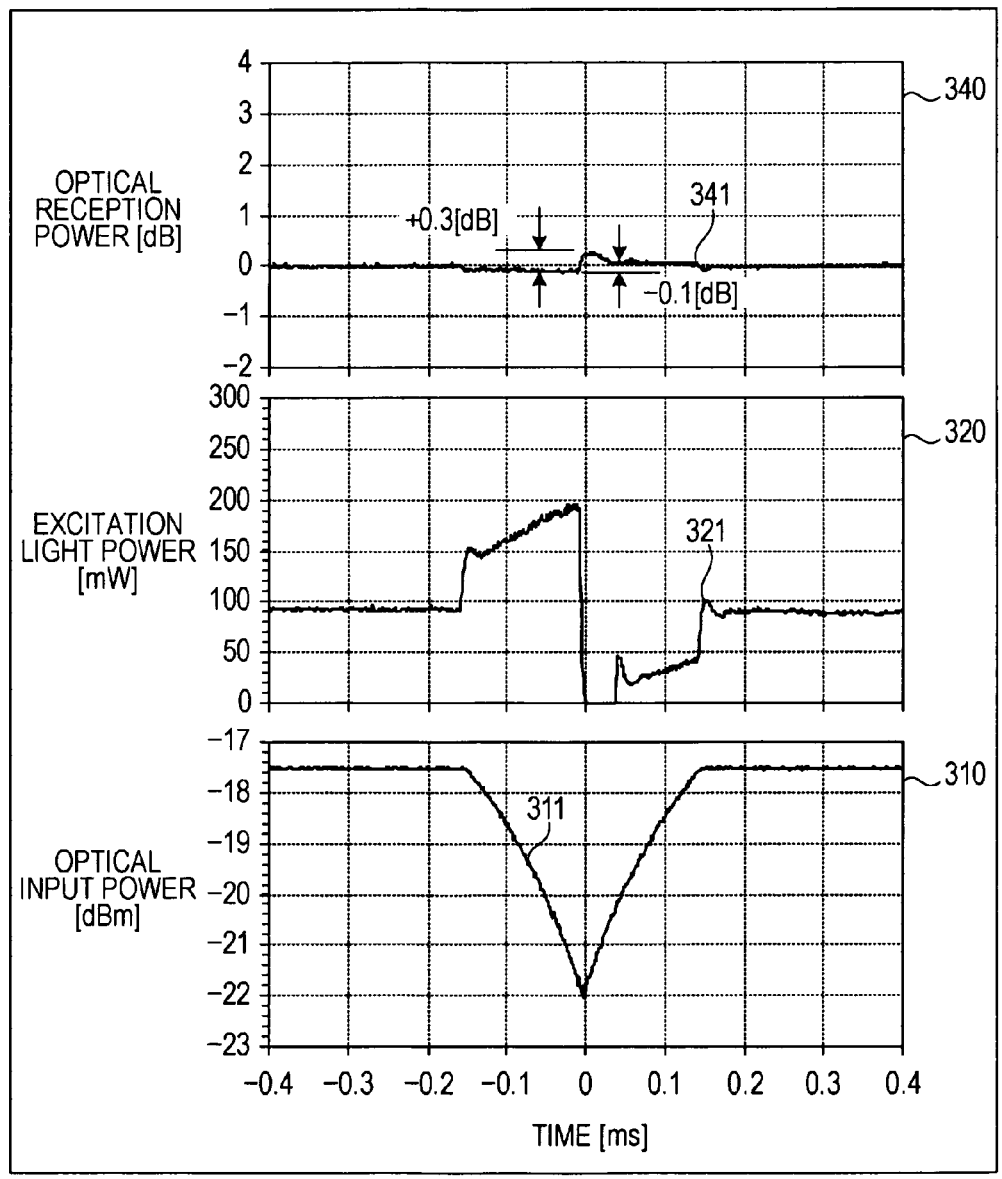
FIG. 17C illustrates example changes in characteristics occurring when an input power of a signal light having a wavelength of 1563.45 nm first decreases and then returns to the original power.

FIG. 17C illustrates example changes in characteristics occurring when the input power of a signal light having a wavelength of 1563.45 nm first decreases and then returns to the original power. In FIGS. 17A to 17C, the same reference numerals are used as in FIGS. 8A to 8C for similar parts, and the description thereof is omitted.

FIGS. 17A to 17C illustrate the example in which the optical input power of the optical receiving apparatus 100 according to the second embodiment decreases from −17.5 dBm by 4.5 dB over 150 μs and then returns to the original power over 150 μs. In the example input into FIGS. 17A to 17C, in accordance with the relationship 1310 illustrated in FIG. 13, the attenuations 0 dB, 1 dB, and 4 dB are set for the wavelengths 1528.77 nm, 1546.12 nm, and 1563.45 nm, respectively.

As illustrated in FIGS. 16A and 17A, when the wavelength of the signal light is 1528.77 nm, the variation in the optical reception power of the optical receiver 106 is suppressed within the range between +0.6 dB at the maximum and −0.2 dB at the minimum.

As illustrated in FIGS. 16B and 17B, when the wavelength of the signal light is 1546.12 nm, the variation in the optical reception power of the optical receiver 106 is suppressed within the range between +1.5 dB at the maximum and −0.6 dB at the minimum.

As illustrated in FIGS. 16C and 17C, when the wavelength of the signal light is 1563.45 nm, the variation in the optical reception power of the optical receiver 106 is suppressed within the range between +1.5 dB at the maximum and −0.5 dB at the minimum. Accordingly, for each wavelength, the variation in the optical reception power of the optical receiver 106 is within the tolerance.

<Example Modification of Optical Receiving Apparatus>

Figure 18:
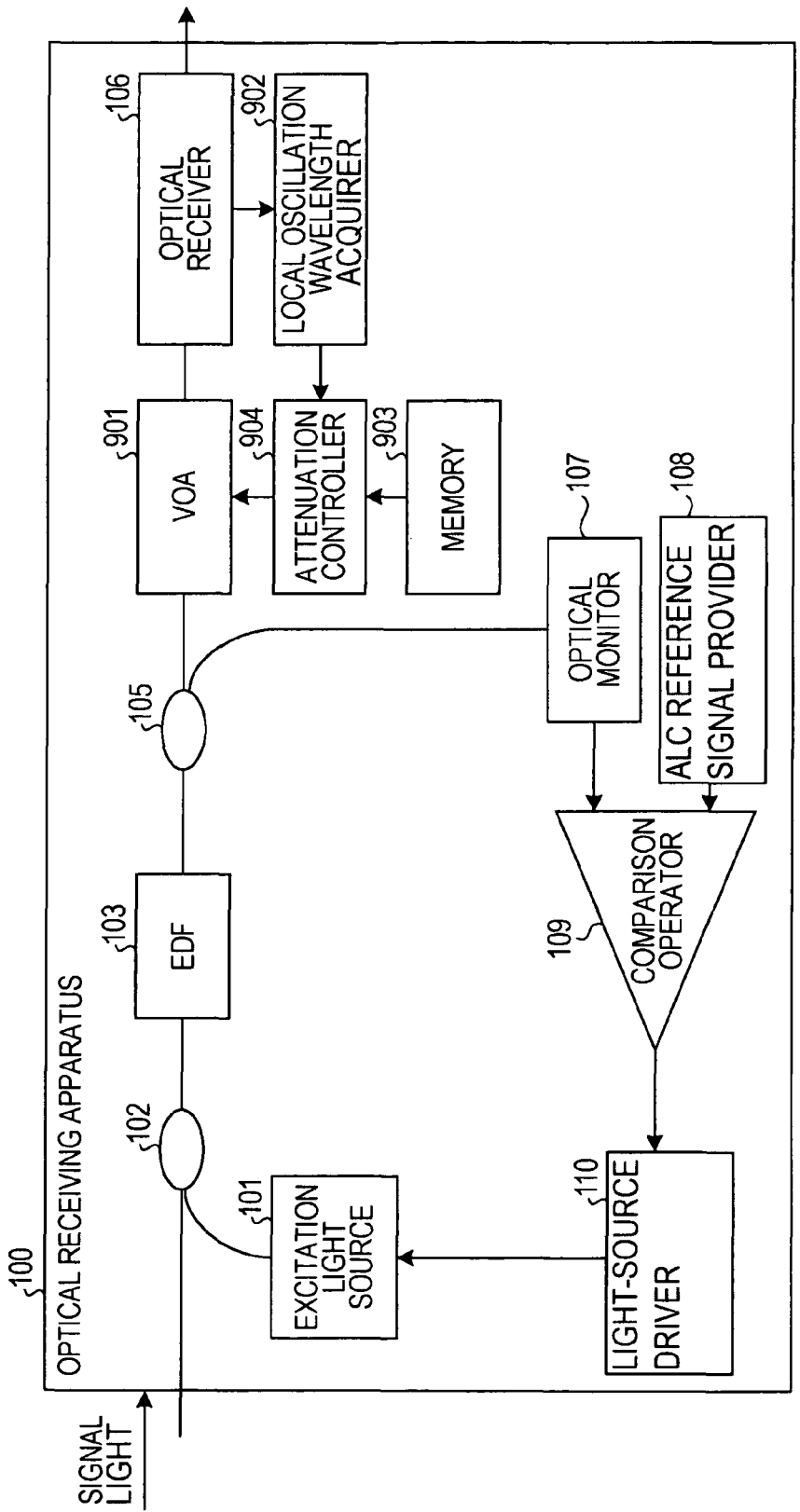
FIG. 18 illustrates an example modification of the optical receiving apparatus according to the second embodiment.

FIG. 18 illustrates an example modification of the optical receiving apparatus according to the second embodiment. In FIG. 18, the same reference numerals are used as in FIG. 9 for similar parts, and the description thereof is omitted. As illustrated in FIG. 18, the splitter 105 in the optical receiving apparatus 100 according to the second embodiment may be disposed between the optical amplification medium 103 and the VOA 901.

In that case, a reference signal output from the ALC reference signal provider 108 is a signal indicating the power in which the amount of the optical loss of the VOA 901 is added to the target optical reception power of the optical receiver 106.

For example, the ALC reference signal provider 108 may acquire the optical loss of the VOA 901 from the attenuation controller 904 and output a reference signal indicating the power in which the amount of the optical loss of the VOA 901 is added to the target optical reception power of the optical receiver 106 in accordance with the acquired optical loss.

Even in that case, the optical reception power of the optical receiver 106 may be maintained at the target power under ALC performed by the light-source driver 110. Because the target value in ALC is the power in which the amount of the optical loss of the VOA 901 is added to the target optical reception power of the optical receiver 106, the optical output power of the optical amplification medium 103 may be increased and the speed of the gain response of the optical amplification medium 103 may be increased. Accordingly, a variation in the optical reception power of the optical receiver 106 caused by a change in the optical input power may be suppressed.

As described above, with the optical receiving apparatus 100 according to the second embodiment, substantially the same advantageous effects as in the optical receiving apparatus 100 according to the first embodiment are obtainable, and the attenuation (optical loss) of the VOA 901 may be controlled in accordance with the wavelength of a signal light.

For example, the optical receiving apparatus 100 may perform control such that the attenuation of the VOA 901 decreases with a reduction in the wavelength of a signal light.

Therefore, when a signal light having a wavelength at which the speed of the gain response of the optical amplification medium 103 is high (short wavelength), a small attenuation may be set in the attenuation of the VOA 901, the power of an excitation light may be reduced, and the power consumption may be suppressed.

<Example Configuration of Optical Receiving Apparatus>

Figure 19:
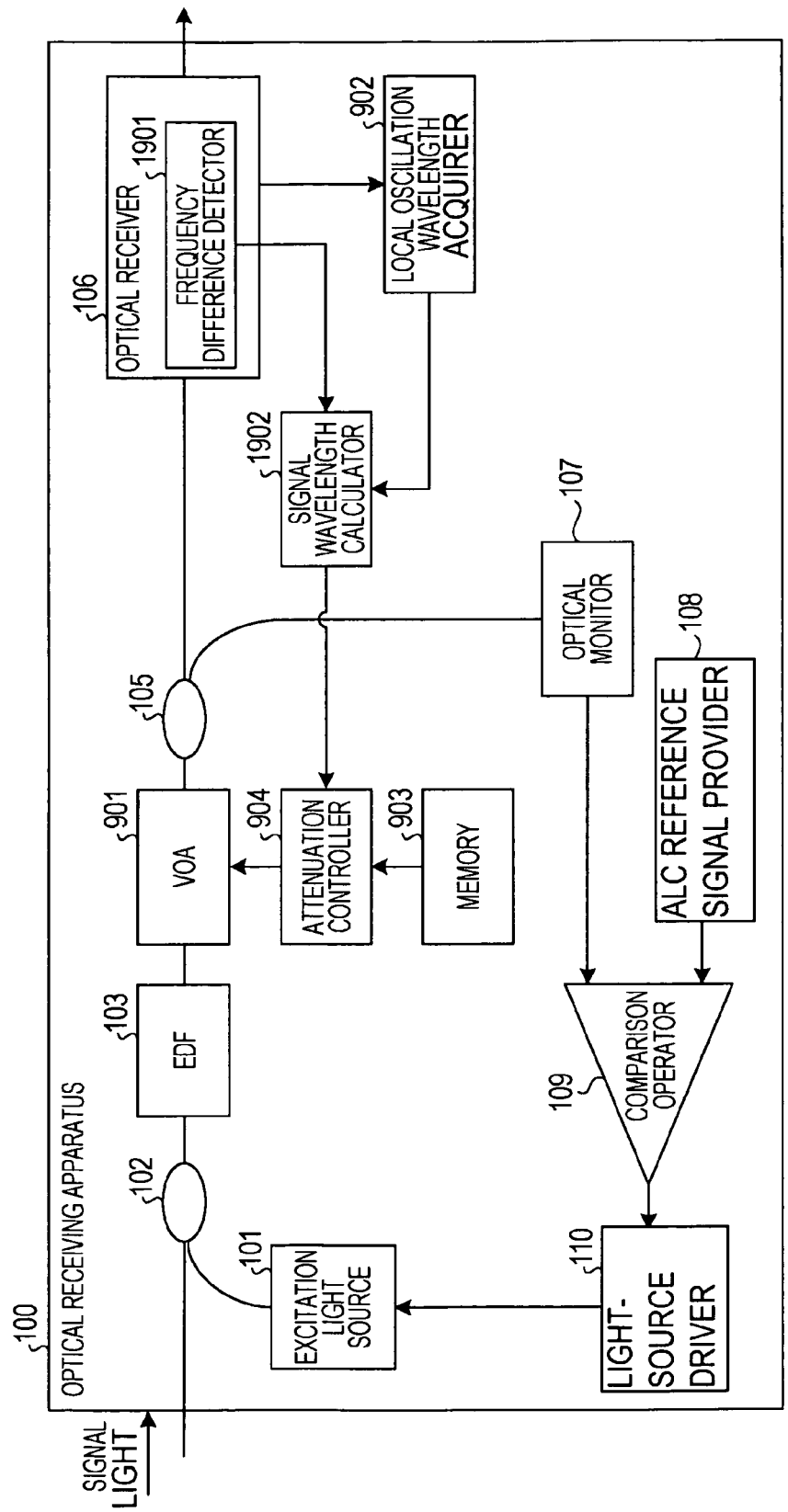
FIG. 19 illustrates an example configuration of an optical receiving apparatus according to a third embodiment.

FIG. 19 illustrates an example configuration of an optical receiving apparatus according to a third embodiment. In FIG. 19, the same reference numerals are used as in FIG. 9 for similar parts, and the description thereof is omitted. As illustrated in FIG. 19, the optical receiving apparatus 100 according to the third embodiment further includes a frequency difference detector 1901 and a signal wavelength calculator 1902, in addition to the configuration illustrated in FIG. 9.

Each of the frequency difference detector 1901 and the signal wavelength calculator 1902 may include circuitry, or alternatively, may include one or more digital signal processors (DSPs) and/or one or more field programmable gate arrays (FPGAs).

The frequency difference detector 1901 may be provided to the optical receiver 106, for example. The frequency difference detector 1901 detects a frequency difference $\Delta\lambda i$ between a local oscillation light and a signal light. The frequency difference $\Delta\lambda i$ detected by the frequency difference detector 1901 is described below with reference to FIG. 20. The frequency difference detector 1901 outputs frequency difference information indicating the detected frequency difference $\Delta\lambda i$ to the signal wavelength calculator 1902.

The local oscillation wavelength acquirer 902 outputs wavelength information indicating the wavelength $\lambda i2$ of the local oscillation light to the signal wavelength calculator 1902.

The signal wavelength calculator 1902 calculates the wavelength $\lambda i1$ of the signal light in accordance with the frequency difference information output from the frequency difference detector 1901 and the wavelength information output from the local oscillation wavelength acquirer 902. For example, the signal wavelength calculator 1902 may calculate the wavelength $\lambda i1$ using the following expression (2):

$$\lambda i1 = \lambda i2 + \Delta\lambda i \quad (2)$$

In the expression (2), $\lambda i2$ is the wavelength indicated by wavelength information on the local oscillation light and $\Delta\lambda i$ denotes the frequency difference indicated by frequency difference information. The signal wavelength calculator 1902 outputs wavelength information indicating the calculated wavelength $\lambda i1$ to the attenuation controller 904.

The attenuation controller 904 acquires the optical loss corresponding to the wavelength indicated by the wavelength information output from the signal wavelength calculator 1902 from correspondence information in the memory 903 and sets the acquired optical loss (attenuation) in the VOA 901.

<Coherent-Detection Optical Receiver>

Figure 20:
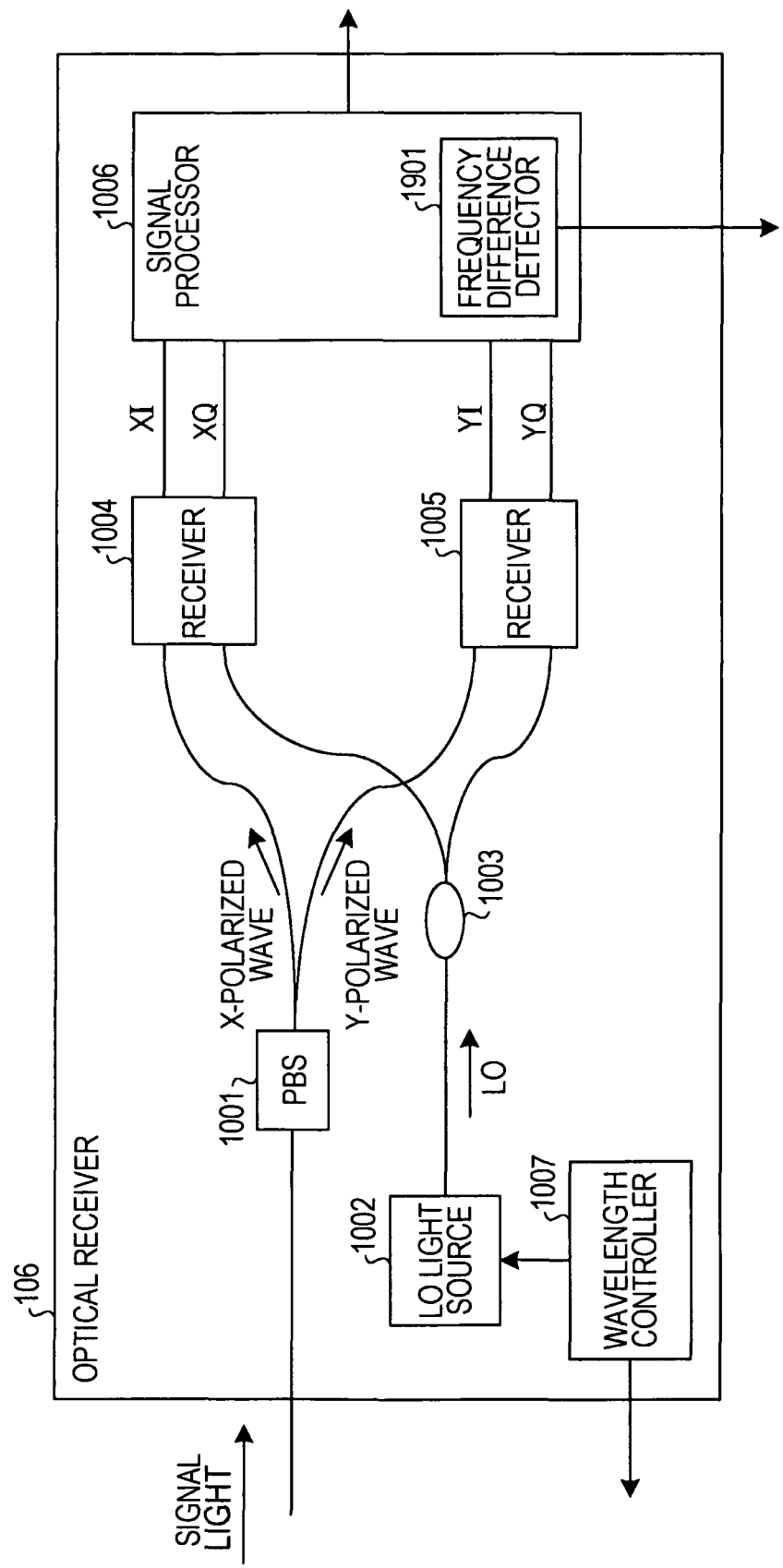
FIG. 20 illustrates an example of a coherent-detection optical receiver according to the third embodiment.

FIG. 20 illustrates an example of a coherent-detection optical receiver according to the third embodiment. In FIG. 20, the same reference numerals are used as in FIG. 10 for similar parts, and the description thereof is omitted. As illustrated in FIG. 20, the optical receiver 106 according to the third embodiment includes the frequency difference detector 1901 in the signal processor 1006 in the configuration illustrated in FIG. 10.

The frequency difference detector 1901 in the signal processor 1006 may include circuitry, or alternatively, may include one or more digital signal processors (DSPs) and/or one or more field programmable gate arrays (FPGAs).

The frequency difference detector 1901 detects the frequency difference $\Delta\lambda i$ between the wavelength $\lambda i2$ of a local oscillation light and the wavelength $\lambda i1$ of a signal light. For example, when the optical receiver 106 is an intradyne optical receiver, the frequency difference detector 1901 detects the frequency difference $\Delta\lambda i$ between a signal light and a local oscillation light that is made to interfere with the signal light.

The signal processor 1006 compensates for the frequency difference of the signal light in accordance with the frequency difference $\Delta\lambda i$ detected by the frequency difference detector 1901.

The frequency difference detector 1901 outputs frequency difference information indicating the frequency difference $\Delta\lambda i$ to the signal wavelength calculator 1902. Thus the signal wavelength calculator 1902 may acquire the frequency difference information indicating the frequency difference $\Delta\lambda i$ between the wavelength $\lambda i2$ of the local oscillation light and the wavelength $\lambda i1$ of the signal light from the optical receiver 106.

Figure 21:
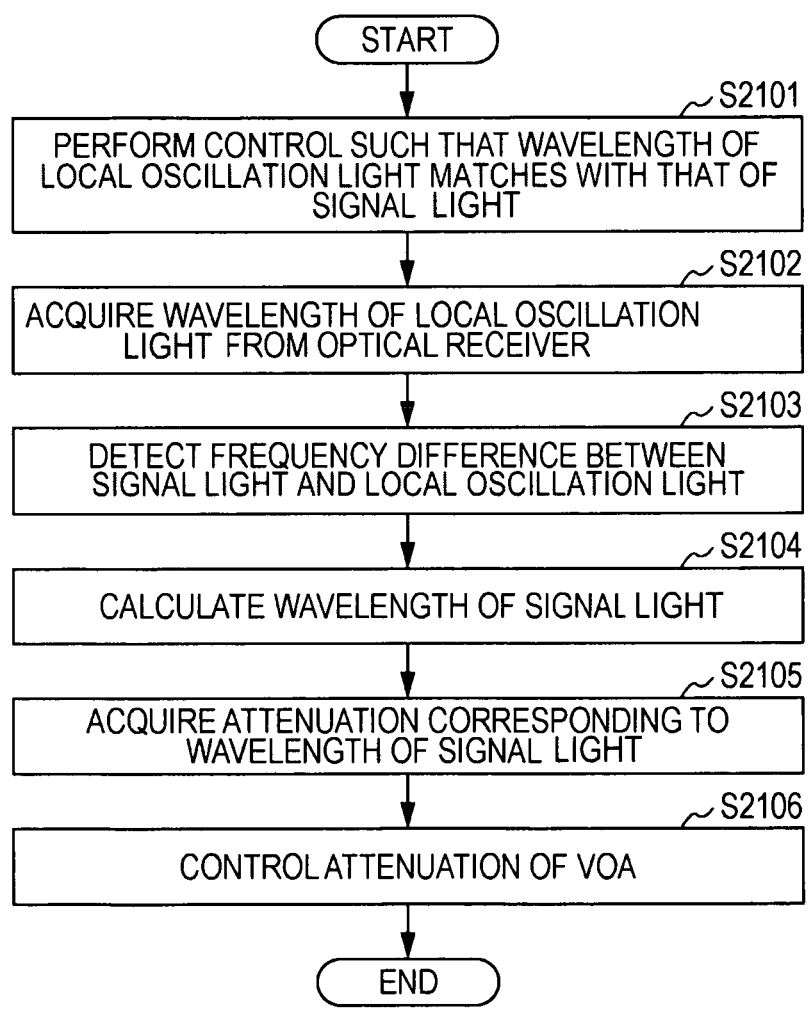
FIG. 21 illustrates an example process of setting an optical loss according to the third embodiment.

FIG. 21 illustrates an example process of setting an optical loss according to the third embodiment. The optical receiving apparatus 100 according to the third embodiment may control the optical loss of the VOA 901 by executing operations illustrated in FIG. 21, for example.

First, the wavelength controller 1007 performs control such that the wavelength $\lambda i2$ of the local oscillation light output from the LO light source 1002 matches with the wavelength $\lambda i1$ of the signal light (operation S2101).

Then, the local oscillation wavelength acquirer 902 acquires the wavelength $\lambda i2$ of the local oscillation light controlled in operation S2101 from the optical receiver 106 (operation S2102).

Then, the frequency difference detector 1901 detects the frequency difference $\Delta\lambda i$ between the signal light and the local oscillation light (operation S2103). Then, the signal wavelength calculator 1902 calculates the wavelength $\lambda i1$ of the signal light in accordance with the wavelength $\lambda i2$ acquired in operation S2102 and the frequency difference $\Delta\lambda i$ detected in operation S2103 (operation S2104).

Then, the attenuation controller 904 acquires the attenuation corresponding to the wavelength $\lambda i1$ of the signal light calculated in operation S2104 in accordance with correspondence information stored in the memory 903 (operation S2105).

Then, the attenuation controller 904 performs control such that the attenuation of the VOA 901 is the same as the attenuation acquired in operation S2105 (operation S2106), and the process is completed. The operations described above enable the optical loss corresponding to the wavelength λi1 of the signal light to be set in the excitation light source 101.

<Example Modification of Optical Receiving Apparatus>

Figure 22:
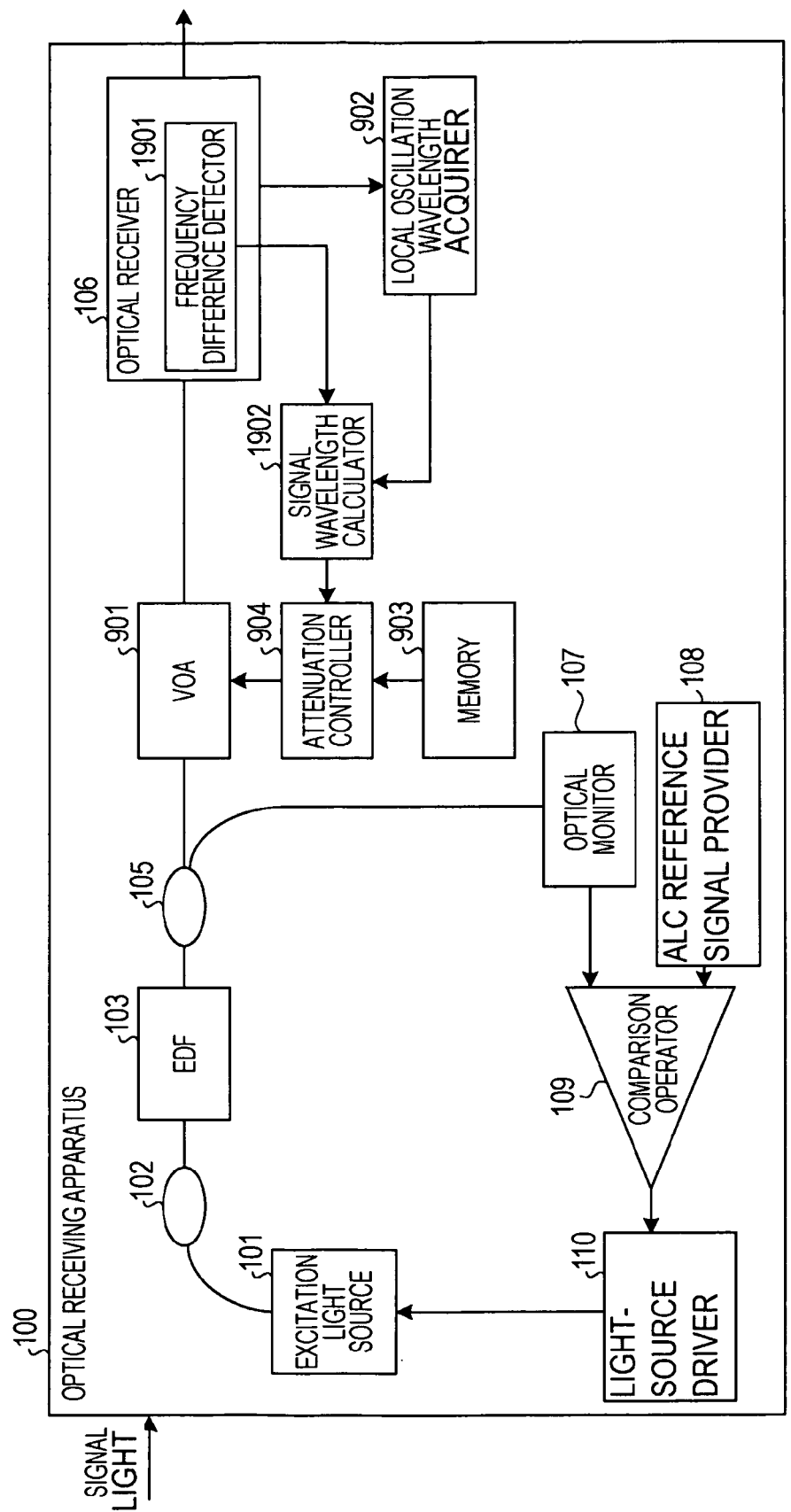
FIG. 22 illustrates an example modification of the optical receiving apparatus according to the third embodiment.

FIG. 22 illustrates an example modification of the optical receiving apparatus according to the third embodiment. In FIG. 22, the same reference numerals are used as in FIG. 19 for similar parts, and the description thereof is omitted. As illustrated in FIG. 22, the splitter 105 in the optical receiving apparatus 100 according to the third embodiment may be disposed between the optical amplification medium 103 and the VOA 901.

In that case, a reference signal output from the ALC reference signal provider 108 is a signal indicating the power in which the amount of the optical loss of the VOA 901 is added to the target optical reception power of the optical receiver 106. For example, the ALC reference signal provider 108 may acquire the optical loss of the VOA 901 from the attenuation controller 904 and output a reference signal indicating the power in which the amount of the optical loss of the VOA 901 is added to the target optical reception power of the optical receiver 106 in accordance with the acquired optical loss.

Even in that case, the optical reception power of the optical receiver 106 may be maintained at the target power under ALC performed by the light-source driver 110. Because the target value in ALC is the power in which the amount of the optical loss of the VOA 901 is added to the target optical reception power of the optical receiver 106, the optical output power of the optical amplification medium 103 may be increased and the speed of the gain response of the optical amplification medium 103 may be increased. Accordingly, a variation in the optical reception power of the optical receiver 106 caused by a change in the optical input power may be suppressed.

As described above, with the optical receiving apparatus 100 according to the third embodiment, substantially the same advantageous effects as in the optical receiving apparatus 100 according to the second embodiment are obtainable, and the wavelength λi1 of a signal light may be calculated in accordance with the wavelength λi2 of a local oscillation light and the frequency difference Δλi.

Thus even if the frequency difference Δλi exists between the local oscillation light and the signal light, the wavelength λi1 of the signal light may be accurately calculated, and control of the attenuation of the VOA 901 may be achieved with high precision. Therefore, the power consumption may be further suppressed.

<Example Configuration of Optical Receiving Apparatus>

Figure 23:
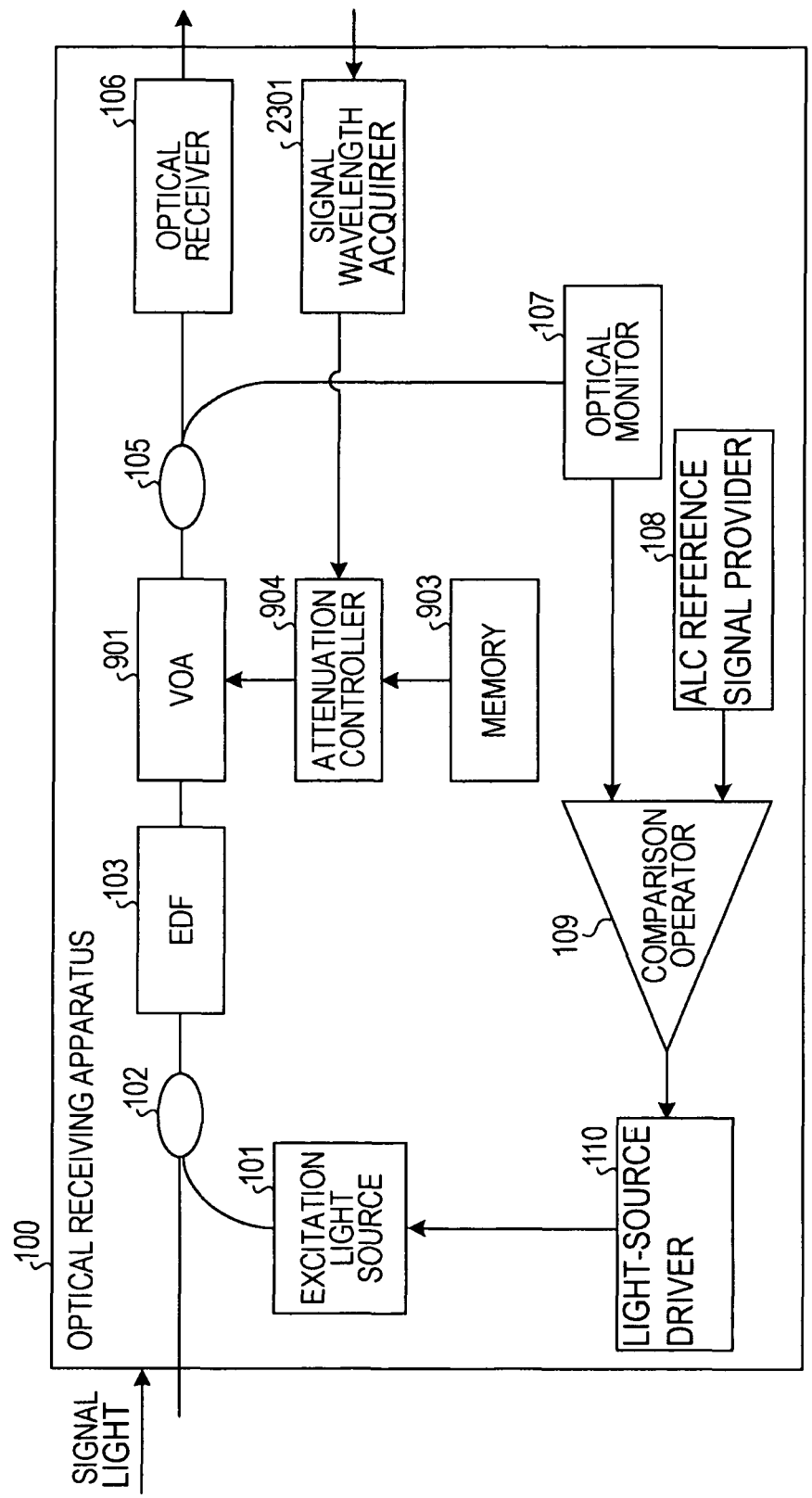
FIG. 23 illustrates an example configuration of an optical receiving apparatus according to a fourth embodiment.

FIG. 23 illustrates an example configuration of an optical receiving apparatus according to a fourth embodiment. In FIG. 23, the same reference numerals are used as in FIG. 9 for similar parts, and the description thereof is omitted. As illustrated in FIG. 23, the optical receiving apparatus 100 according to the fourth embodiment further includes a signal wavelength acquirer 2301, instead of the local oscillation wavelength acquirer 902 illustrated in FIG. 9. The signal wavelength acquirer 2301 may include circuitry, or alternatively, may include one or more digital signal processors (DSPs) and/or one or more field programmable gate arrays (FPGAs).

The signal wavelength acquirer 2301 acquires wavelength information indicating the wavelength λi1 of a signal light received by the optical receiving apparatus 100 from an outside apparatus that interfaces with the optical receiving apparatus 100.

For example, the signal wavelength acquirer 2301 may acquire the wavelength information from an optical transmitting apparatus that transmitted a signal light received by the optical receiving apparatus 100. Alternatively, the signal wavelength acquirer 2301 may acquire the wavelength information from a management apparatus that manages an optical communication system including the optical receiving apparatus 100.

The signal wavelength acquirer 2301 outputs the acquired wavelength information to the attenuation controller 904. The attenuation controller 904 acquires the optical loss corresponding to the wavelength indicated by the wavelength information output from the signal wavelength acquirer 2301 from correspondence information in the memory 903 and sets the acquired optical loss (attenuation) in the VOA 901.

<Process of Setting Optical Loss>

Figure 24:
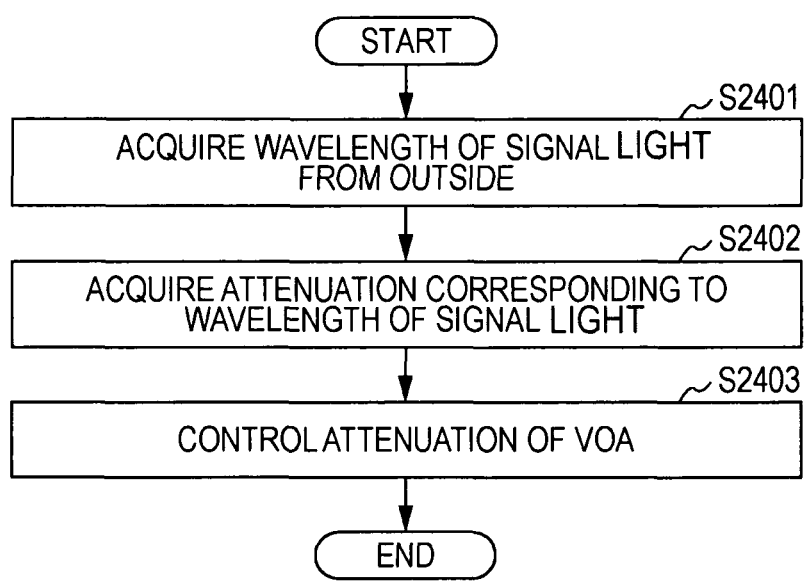
FIG. 24 illustrates an example process of setting an optical loss according to the fourth embodiment.

FIG. 24 illustrates an example process of setting an optical loss according to the fourth embodiment. The optical receiving apparatus 100 according to the fourth embodiment may control the optical loss of the VOA 901 by executing operations illustrated in FIG. 24, for example. First, the signal wavelength acquirer 2301 acquires the wavelength λi1 of a signal light from outside (operation S2401).

Then, the attenuation controller 904 acquires the attenuation corresponding to the wavelength λi1 of the signal light acquired in operation S2401 in accordance with correspondence information stored in the memory 903 (operation S2402). Then, the attenuation controller 904 performs control such that the attenuation of the VOA 901 is the same as the optical loss acquired in operation S2402 (operation S2403), and the process is completed.

The operations described above enable the optical loss corresponding to the wavelength λi1 of the signal light to be set in the excitation light source 101. The process of performing control such that wavelength λi2 of the local oscillation light output from the LO light source 1002 matches with the wavelength Δλi of the signal light may be carried out by the wavelength controller 1007, separately from the process of setting an optical loss, for example.

<Example Modification of Optical Receiving Apparatus>

Figure 25:
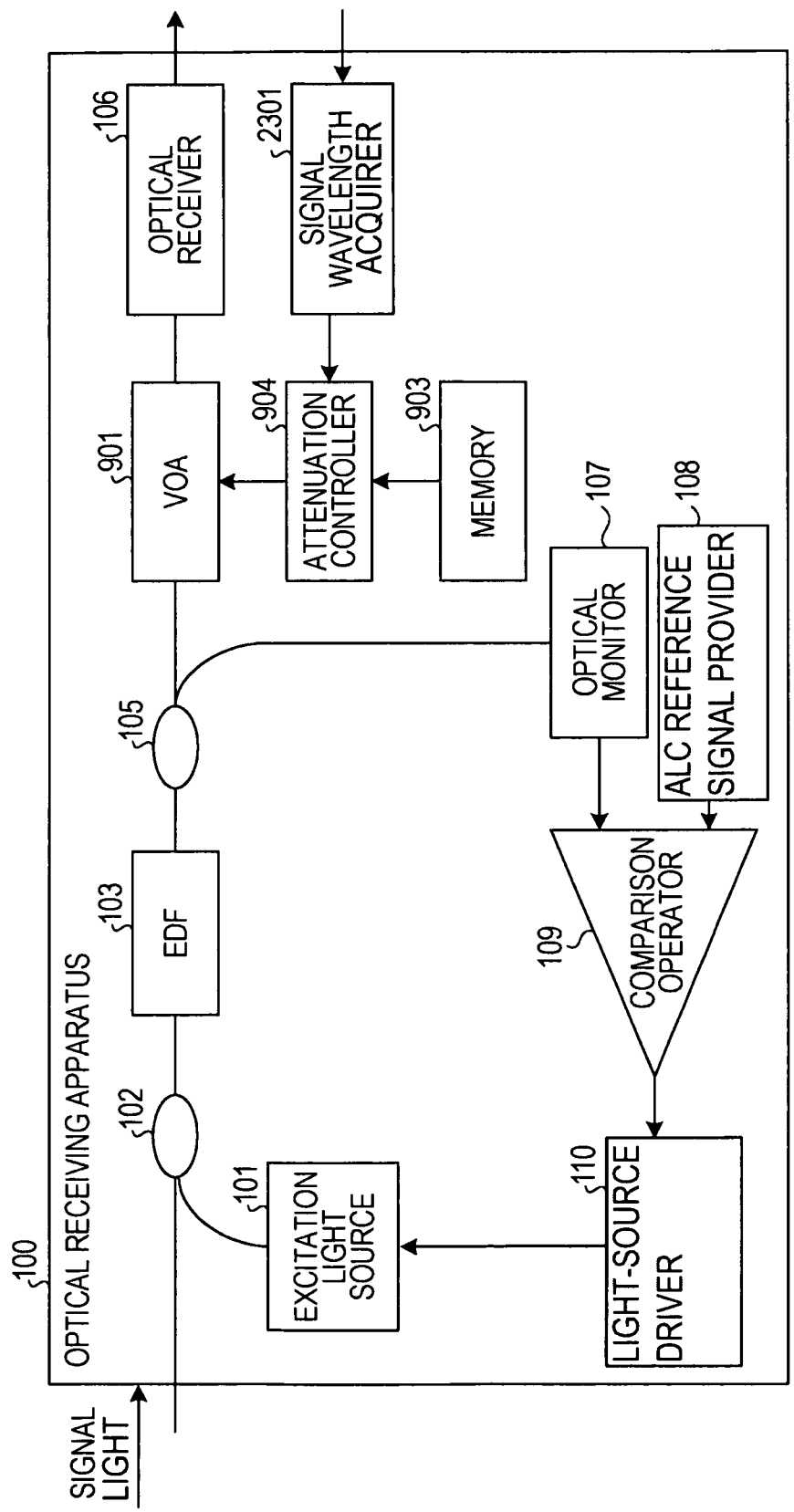
FIG. 25 illustrates an example modification of the optical receiving apparatus according to the fourth embodiment.

FIG. 25 illustrates an example modification of the optical receiving apparatus according to the fourth embodiment. In FIG. 25, the same reference numerals are used as in FIG. 23 for similar parts, and the description thereof is omitted. As illustrated in FIG. 25, the splitter 105 in the optical receiving apparatus 100 according to the fourth embodiment may be disposed between the optical amplification medium 103 and the VOA 901.

In that case, a reference signal output from the ALC reference signal provider 108 is a signal indicating the power in which the amount of the optical loss of the VOA 901 is added to the target optical reception power of the optical receiver 106.

For example, the ALC reference signal provider 108 may acquire the optical loss of the VOA 901 from the attenuation controller 904 and output a reference signal indicating the power in which the amount of the optical loss of the VOA 901 is added to the target optical reception power of the optical receiver 106 in accordance with the acquired optical loss.

Even in that case, the optical reception power of the optical receiver 106 may be maintained at the target power under ALC performed by the light-source driver 110. Because the target value in ALC is the power in which the amount of the optical loss of the VOA 901 is added to the target optical reception power of the optical receiver 106, the optical output power of the optical amplification medium 103 may be increased and the speed of the gain response of the optical amplification medium 103 may be increased. Accordingly, a variation in the optical reception power of the optical receiver 106 caused by a change in the optical input power may be suppressed.

As described above, with the optical receiving apparatus 100 according to the fourth embodiment, substantially the same advantageous effects as in the optical receiving apparatus 100 according to the first embodiment are obtainable, and the attenuation (optical loss) of the VOA 901 may be controlled in accordance with the wavelength of the signal light.

Therefore, when a signal light having a wavelength at which the speed of the gain response of the optical amplification medium 103 is relatively high (short wavelength) is received, the attenuation of the VOA 901 may be set at a small amount, the excitation light power may be reduced, and the power consumption may be suppressed.

In the second to fourth embodiments, if the wavelength of the local oscillation light or that of the signal light has been found in advance, the optical loss corresponding to the previously found wavelength may be set in the VOA 901. In that case, the VOA 901 may be an optical attenuation medium that has a fixed attenuation.

In that case, the local oscillation wavelength acquirer 902, the memory 903, the signal wavelength calculator 1902, or the signal wavelength acquirer 2301 may be omitted. This enables a reduction in the power consumption even with a simple configuration.

<Example Configuration of Optical Receiving Apparatus>

Figure 26:
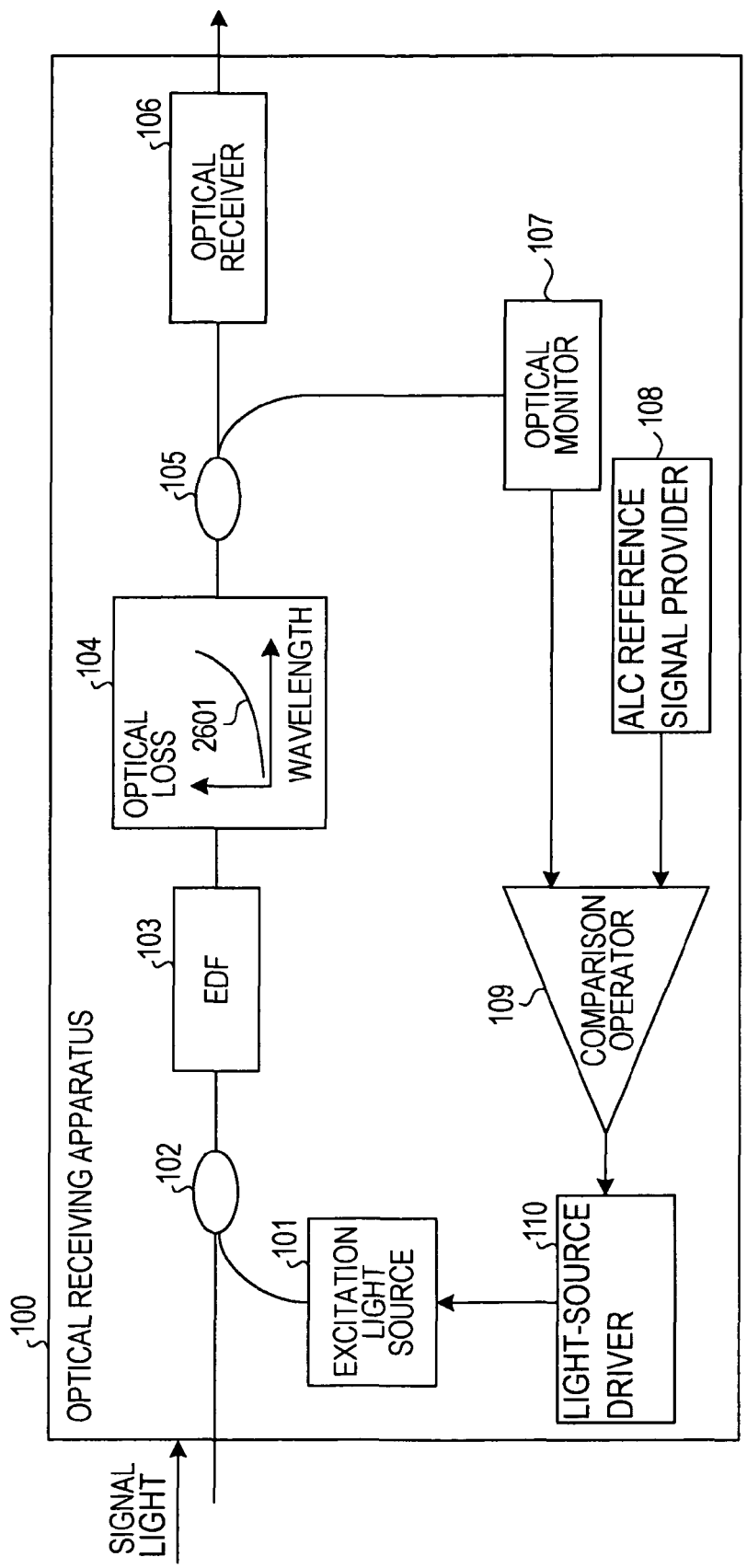
FIG. 26 illustrates an example configuration of an optical receiving apparatus according to a fifth embodiment.

FIG. 26 illustrates an example configuration of an optical receiving apparatus according to a fifth embodiment. In FIG. 26, the same reference numerals are used as in FIG. 1 for similar parts, and the description thereof is omitted. As illustrated in FIG. 26, the optical loss medium 104 in the optical receiving apparatus 100 according to the fifth embodiment includes a wavelength characteristic 2601, in which the optical loss varies with the wavelength of an input light.

The wavelength characteristic 2601 is the one in which the amount of a loss decreases with a reduction in the wavelength of a light. For example, the relationship between the wavelength and the optical loss in the wavelength characteristic 2601 may be substantially the same as the relationship 1310 illustrated in FIG. 13. This enables an optical loss at which the variation in the optical reception power of the optical receiver 106 is within the tolerance to be provided to the signal light in accordance with the wavelength of a signal light.

As described above, with the optical receiving apparatus 100 according to the fifth embodiment, substantially the same advantageous effects as in the optical receiving apparatus 100 according to the first embodiment are obtainable, and the optical loss corresponding to the wavelength of a signal light may be provided to the optical signal.

Therefore, when a signal light having a wavelength at which the speed of the gain response of the optical amplification medium 103 is relatively high (short wavelength) is received, the attenuation of the VOA 901 may be set at a small amount, the excitation light power may be reduced, and the power consumption may be suppressed.

<Example Configuration of Optical Amplifying Apparatus>

Figure 27:
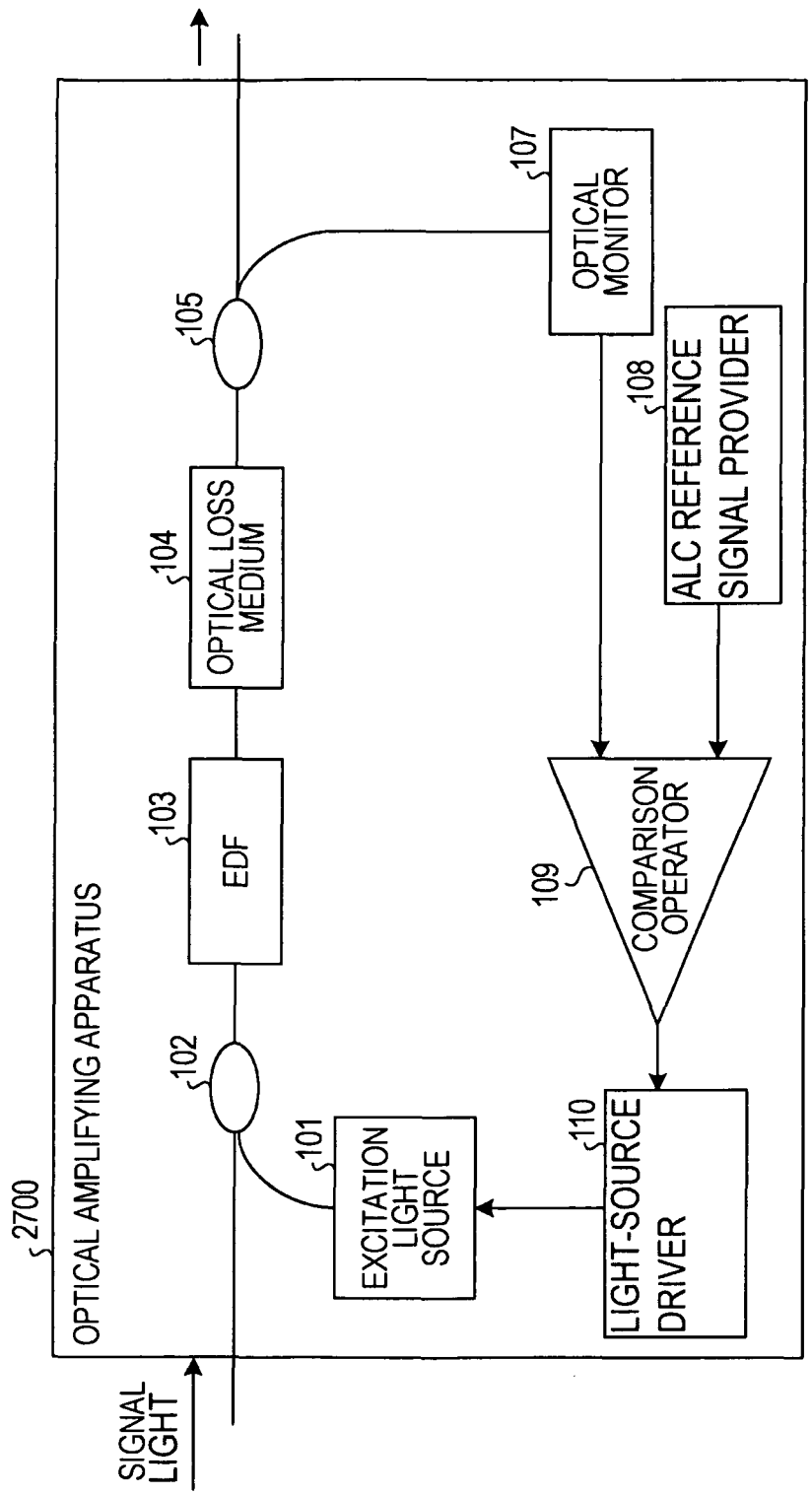
FIG. 27 illustrates an example configuration of an optical amplifying apparatus according to a sixth embodiment.

FIG. 27 illustrates an example configuration of an optical amplifying apparatus according to a sixth embodiment. In FIG. 27, the same reference numerals are used as in FIG. 1 for similar parts, and the description thereof is omitted. An optical amplifying apparatus 2700 according to the sixth embodiment is an optical amplifying apparatus that amplifies an input signal light.

As illustrated in FIG. 27, the optical amplifying apparatus 2700 has a configuration in which the optical receiver 106 is omitted from the optical receiving apparatus 100 illustrated in FIG. 1.

The splitter 105 outputs a split signal light to after the optical amplifying apparatus 2700. In that case, a given power indicated by a reference signal output from the ALC reference signal provider 108 is a target power of a signal light output from the optical amplifying apparatus 2700.

Here, the case where the optical amplifying apparatus 2700 is used in an optical repeater in an optical transmission system is described as an example. In the optical transmission system, when a variation in the output power from the optical amplifying apparatus 2700 is accumulated, the power may depart from the dynamic range of an optical receiver in a receiving station, and this may cause a reception error in an in-service transmission signal.

The tolerance of the variation in the output power of each of the optical amplifying apparatuses 2700 is determined from the configuration of the optical transmission system.

For the optical amplifying apparatus 2700 according to the sixth embodiment, increasing the optical output power of the optical amplification medium 103 by disposing the optical loss medium 104 after the optical amplification medium 103 enables an increase in the speed of the gain response of the optical amplification medium 103 to a change in the excitation light power resulting from a change in the optical input power.

Thus the variation in the output power of the optical amplifying apparatus 2700 caused by the change in the optical input power may be within the tolerance.

Therefore, the quality of optical transmission may be improved even with a simple configuration.

<Example Configuration of Optical Amplifying Apparatus>

Figure 28:
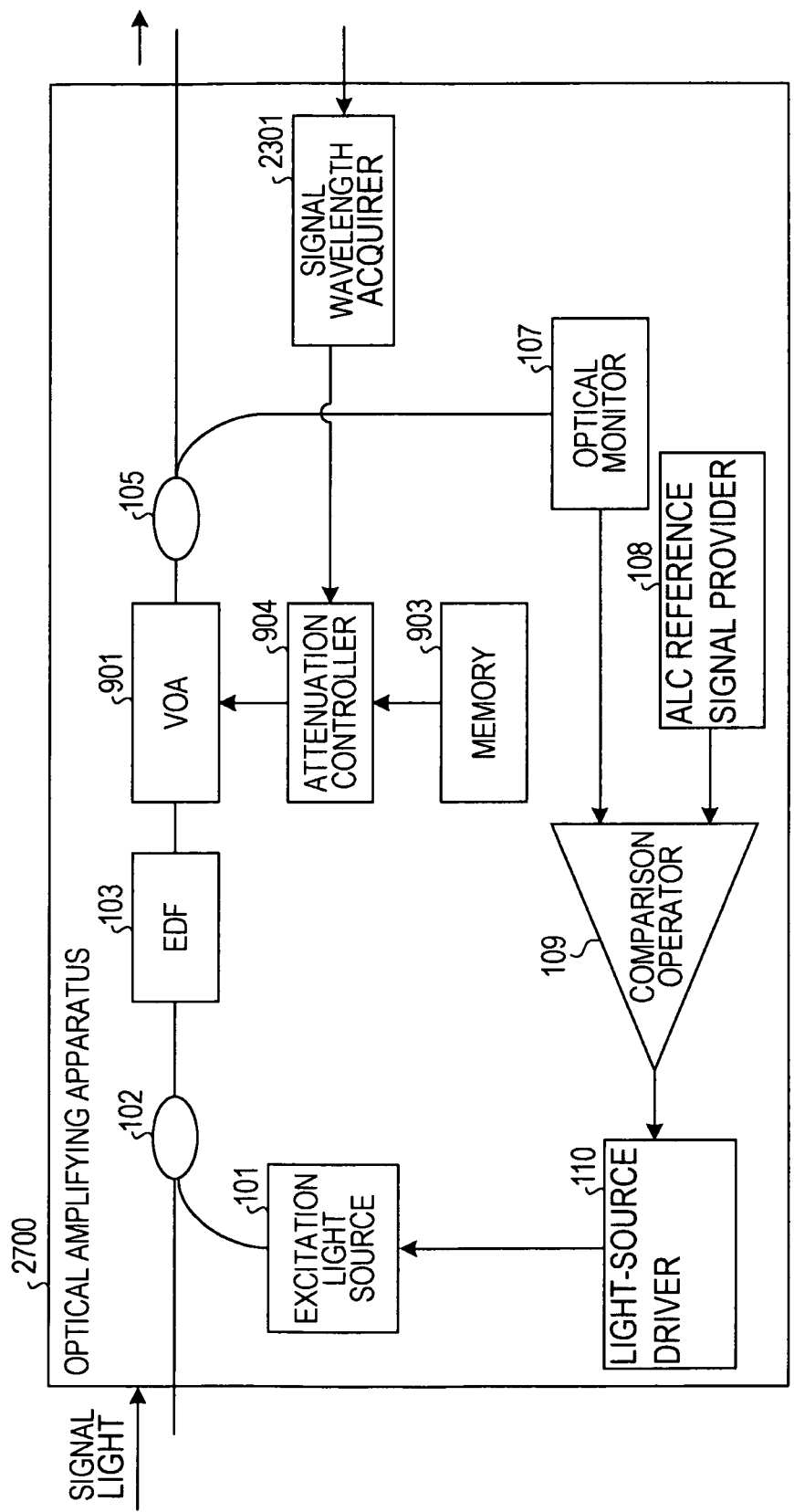
FIG. 28 illustrates an example configuration of an optical amplifying apparatus according to a seventh embodiment.

FIG. 28 illustrates an example configuration of an optical amplifying apparatus according to a seventh embodiment. In FIG. 28, the same reference numerals are used as in FIG. 23 or FIG. 27 for similar parts, and the description thereof is omitted. The optical amplifying apparatus 2700 according to the seventh embodiment is an optical amplifying apparatus that amplifies an input signal light.

As illustrated in FIG. 28, the optical amplifying apparatus 2700 has a configuration in which the optical receiver 106 is omitted from the optical receiving apparatus 100 illustrated in FIG. 23.

With the optical amplifying apparatus 2700 according to the seventh embodiment, substantially the same advantageous effects as in the optical amplifying apparatus 2700 according to the sixth embodiment are obtainable, and the optical loss of the VOA 901 may be controlled in accordance with the wavelength of the signal light.

Therefore, when a signal light having a wavelength at which the speed of the gain response of the optical amplification medium 103 is relatively high (short wavelength) is received, the attenuation of the VOA 901 may be set at a small amount, the excitation light power may be reduced, and the power consumption may be suppressed.

In the seventh embodiment, if the wavelength of the local oscillation light or that of the signal light has been found in advance, the optical loss corresponding to the previously found wavelength may be set in the VOA 901. In that case, the VOA 901 may be an optical attenuation medium that has a fixed attenuation.

In that case, the memory 903, the attenuation controller 904, and the signal wavelength acquirer 2301 may be omitted. This enables a reduction in the power consumption even with a simple configuration.

<Example Configuration of Optical Amplifying Apparatus>

Figure 29:
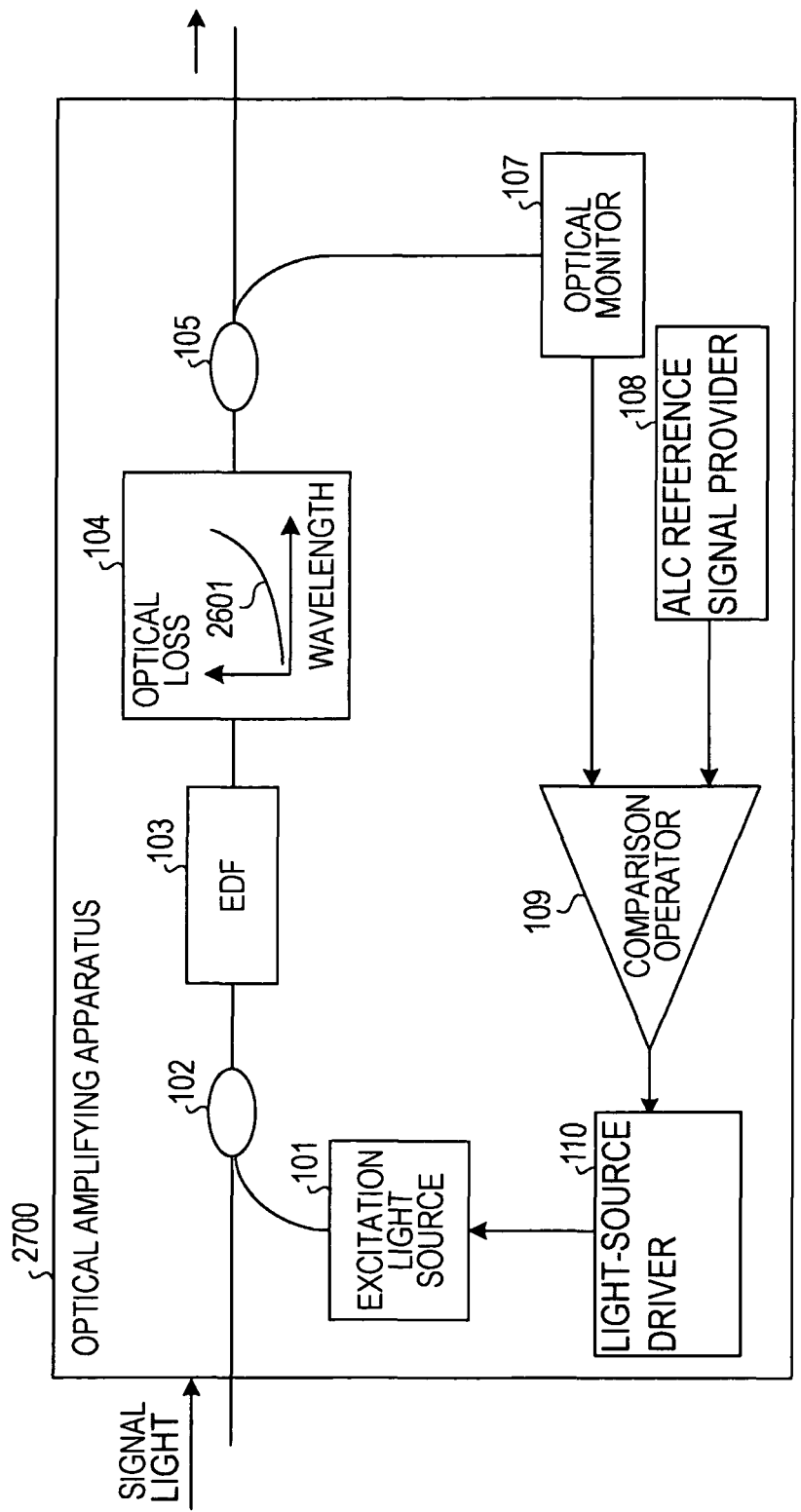
FIG. 29 illustrates an example configuration of an optical amplifying apparatus according to an eighth embodiment.

FIG. 29 illustrates an example configuration of an optical amplifying apparatus according to an eighth embodiment. In FIG. 29, the same reference numerals are used as in FIG. 26 or FIG. 27 for similar parts, and the description thereof is omitted. The optical amplifying apparatus 2700 according to the eighth embodiment is an optical amplifying apparatus that amplifies an input signal light.

As illustrated in FIG. 29, the optical amplifying apparatus 2700 has a configuration in which the optical receiver 106 is omitted from the optical receiving apparatus 100 illustrated in FIG. 26.

With the optical amplifying apparatus 2700 according to the eighth embodiment, substantially the same advantageous effects as in the optical amplifying apparatus 2700 according to the sixth embodiment are obtainable, and the optical loss corresponding to the wavelength of a signal light may be provided to an optical signal even with a simple configuration.

Therefore, when a signal light having a wavelength at which the speed of the gain response of the optical amplification medium 103 is relatively high (short wavelength) is received, the attenuation of the VOA 901 may be set at a small amount, the excitation light power may be reduced, and the power consumption may be suppressed.

As described above, with the optical receiving apparatus and the optical amplifying apparatus of the disclosure, the advantageous effect of being capable of having an improved quality of optical transmission is obtainable.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has(have) been described in detail, it should be understood that the various changes, substitutions, and alterations could be made hereto without departing from the spirit and scope of the invention.

What is claimed is:

1. An optical receiving apparatus comprising:
    an optical amplification medium that receives an excitation light and an input light;
    an optical loss medium that receives an output light from the optical amplification medium;
    a monitor that detects a power level of light output from the optical amplification medium;
    a controller that controls a power of the excitation light such that the power level of the light detected by the monitor minus a power loss level at the optical loss medium is at a target value as a power level output from the optical loss medium; and
    a receiver that receives the output light from the optical loss medium.

2. The optical receiving apparatus according to claim 1, further comprising:
    a reference signal provider that outputs a reference signal indicating a given power; and
    a comparison operator that outputs a difference between the power level of the light detected by the monitor and the given power indicated by the reference signal from the reference signal provider,
    wherein the controller controls the excitation light source such that the output of the comparison operator is reduced.

3. The optical receiving apparatus according to claim 1, wherein the optical loss medium is a variable optical attenuator having a variable attenuation, and
    the controller controls the attenuation of the variable optical attenuator in accordance with wavelength information indicating a wavelength of the input light.

4. The optical receiving apparatus according to claim 3, wherein the controller controls the attenuation of the variable optical attenuator in accordance with the wavelength information such that a gain response characteristic of the optical amplification medium to a change in the excitation light is enhanced.

5. The optical receiving apparatus according to claim 3, wherein the receiver is a coherent receiver that includes a local oscillation light source that emits a local oscillation light, and
    as the wavelength information, wavelength information indicating a wavelength of the local oscillation light is used.

6. The optical receiving apparatus according to claim 3, wherein the receiver is a coherent receiver that includes a local oscillation light source that emits a local oscillation light, and
    the wavelength information on the input light is based on a frequency difference between the local oscillation light and the input light and on wavelength information indicating a wavelength of the local oscillation light.

7. The optical receiving apparatus according to claim 1, wherein the optical loss medium has a characteristic in which a loss decreases with a reduction in a wavelength of the input light.

8. An optical amplifying apparatus comprising:
    an excitation light source that emits an excitation light;
    an optical amplification medium that receives the excitation light and an input light;
    an optical loss medium that receives an output light from the optical amplification medium;
    a monitor that detects a power of light output from the optical amplification medium; and
    a controller that controls the excitation light source such that the power of the output light detected by the monitor minus a power loss level at the optical loss medium is at a target value as a power level output from the optical loss medium.

9. The optical amplifying apparatus according to claim 8, further comprising:
    a reference signal provider that outputs a reference signal indicating a given power; and
    a comparison operator that outputs a difference between the power of the light detected by the monitor and the given power indicated by the reference signal from the reference signal provider,
    wherein the controller controls the excitation light source such that the output of the comparison operator is reduced.

10. The optical amplifying apparatus according to claim 8, wherein the optical loss medium is a variable optical attenuator, and
    the attenuation of the variable optical attenuator is controlled in accordance with wavelength information indicating a wavelength of the input light.

11. The optical amplifying apparatus according to claim 10, wherein the controller controls the attenuation of the variable optical attenuator in accordance with the wavelength information such that a gain response characteristic of the optical amplification medium to a change in the power of the excitation light is enhanced.

12. The optical amplifying apparatus according to claim 8, wherein the optical loss medium has a characteristic in which a loss decreases with a reduction in a wavelength of the input light.

* * * * *

UNITED STATES PATENT AND TRADEMARK OFFICE
CERTIFICATE OF CORRECTION

PATENT NO. : 8,917,445 B2  Page 1 of 1
APPLICATION NO. : 13/356049
DATED : December 23, 2014
INVENTOR(S) : Masao Nakata It is certified that error appears in the above-identified patent and that said Letters Patent is hereby corrected as shown below:

In the Claims
Column 25, line 53, in Claim 1, after "a power level of" insert -- a --.

Column 26, line 44, in Claim 8, alter "detects a power of" insert -- a --.

Signed and Sealed this
Fifth Day of May, 2015

Michelle K. Lee
*Director of the United States Patent and Trademark Office*